United States Patent
Roppongi et al.

(10) Patent No.: US 8,094,399 B2
(45) Date of Patent: Jan. 10, 2012

(54) MAGNETIC RECORDING APPARATUS PROVIDED WITH MICROWAVE-ASSISTED HEAD

(75) Inventors: Tetsuya Roppongi, Tokyo (JP); Takuya Adachi, Tokyo (JP); Isamu Sato, Tokyo (JP); Hiroshi Ikeda, Tokyo (JP); Mikio Matsuzaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/721,034

(22) Filed: Mar. 10, 2010

(65) Prior Publication Data

US 2011/0222185 A1 Sep. 15, 2011

(51) Int. Cl.
*G11B 5/02* (2006.01)
(52) U.S. Cl. .......................... 360/55; 360/59
(58) Field of Classification Search ................... None
See application file for complete search history.

(56) References Cited

U.S. PATENT DOCUMENTS

| | | | |
|---|---|---|---|
| 6,741,524 B2 | 5/2004 | Ichihara et al. | |
| 6,785,092 B2 | 8/2004 | Covington et al. | |
| 7,256,955 B2 * | 8/2007 | Pokhil et al. | 360/68 |
| 2007/0253106 A1 | 11/2007 | Sato et al. | |
| 2007/0297081 A1 | 12/2007 | Nazarov et al. | |
| 2008/0151436 A1 | 6/2008 | Sato et al. | |
| 2010/0073804 A1 * | 3/2010 | Ikeda et al. | 360/59 |
| 2010/0309577 A1 * | 12/2010 | Gao et al. | 360/75 |

OTHER PUBLICATIONS

Xiaochun Zhu, et al. "Bias-Field-Free Microwave Oscillator Driven by Perpendicularly Polarized Spin Current", IEEE Transactions on Magnetics, vol. 42, No. 10, pp. 2670-2672, Oct. 2006.
Zihui Wang, et al. "Chirped-microwave assisted magnetization reversal", Journal of Applied Physics 105, 093903, 2009.
U.S. Appl. No. 12/700,278, filed Feb. 5, 2010 for Hiroshi Ikeda, et al.

* cited by examiner

*Primary Examiner* — Daniell L Negron
(74) *Attorney, Agent, or Firm* — Frommer Lawrence & Haug LLP

(57) ABSTRACT

A magnetic recording apparatus includes a magnetic recording medium having a magnetic recording layer, a thin-film magnetic head with a microwave-band magnetic drive function, the head having a write field generation means that generates a write field to the magnetic recording medium in response to a write signal, and a microwave generator that is provided independent of the write field generation means and generates an alternating magnetic field in plane having a microwave-band frequency when microwave-excitation current is fed, an excitation current generation means that generates the microwave-excitation current by amplitude-modulating microwave carrier current with a modulating signal having a fixed period, and a write signal supply means that generates the write signal and applies it to the write field generation means of the thin-film magnetic head.

9 Claims, 18 Drawing Sheets

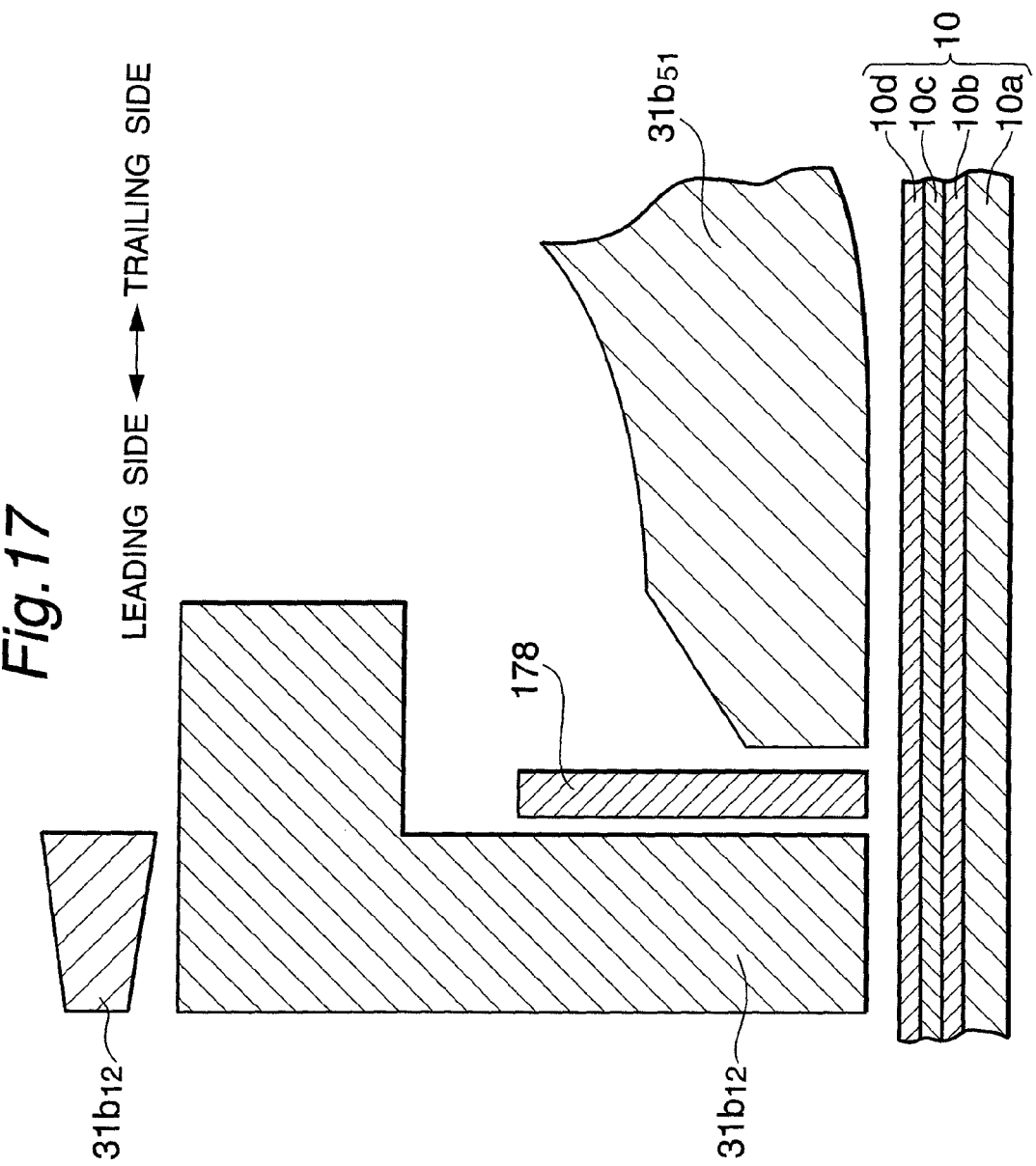

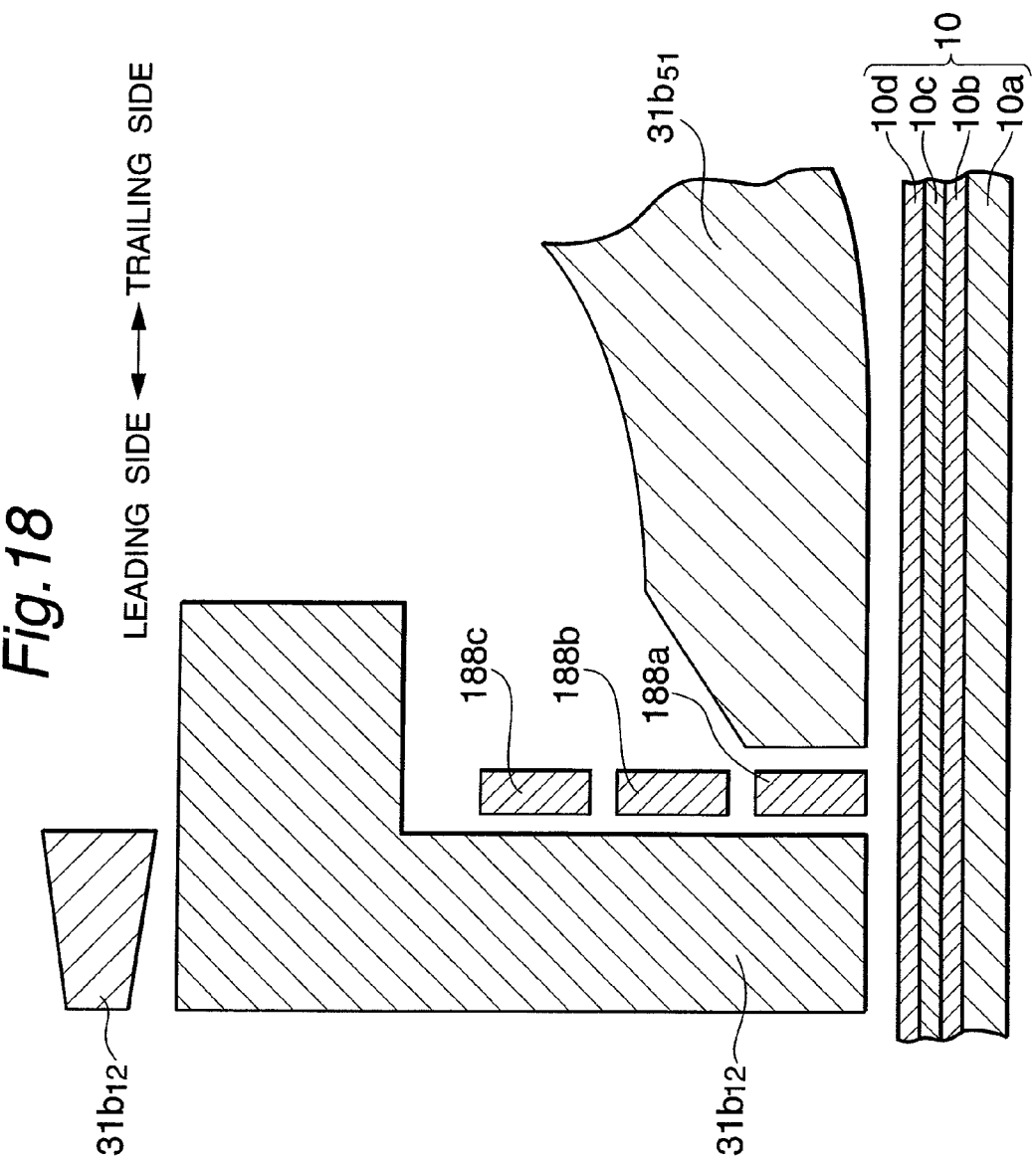

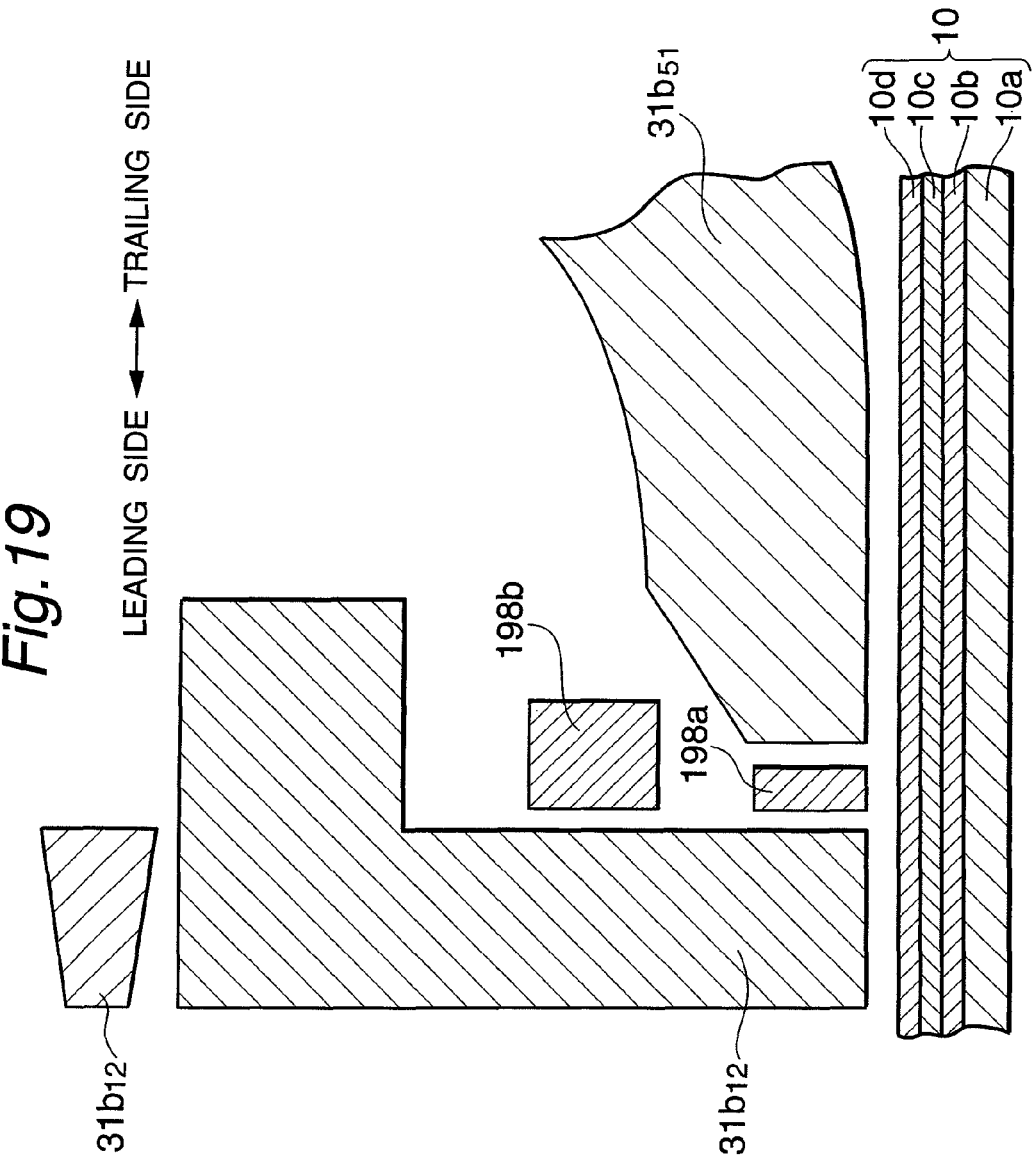

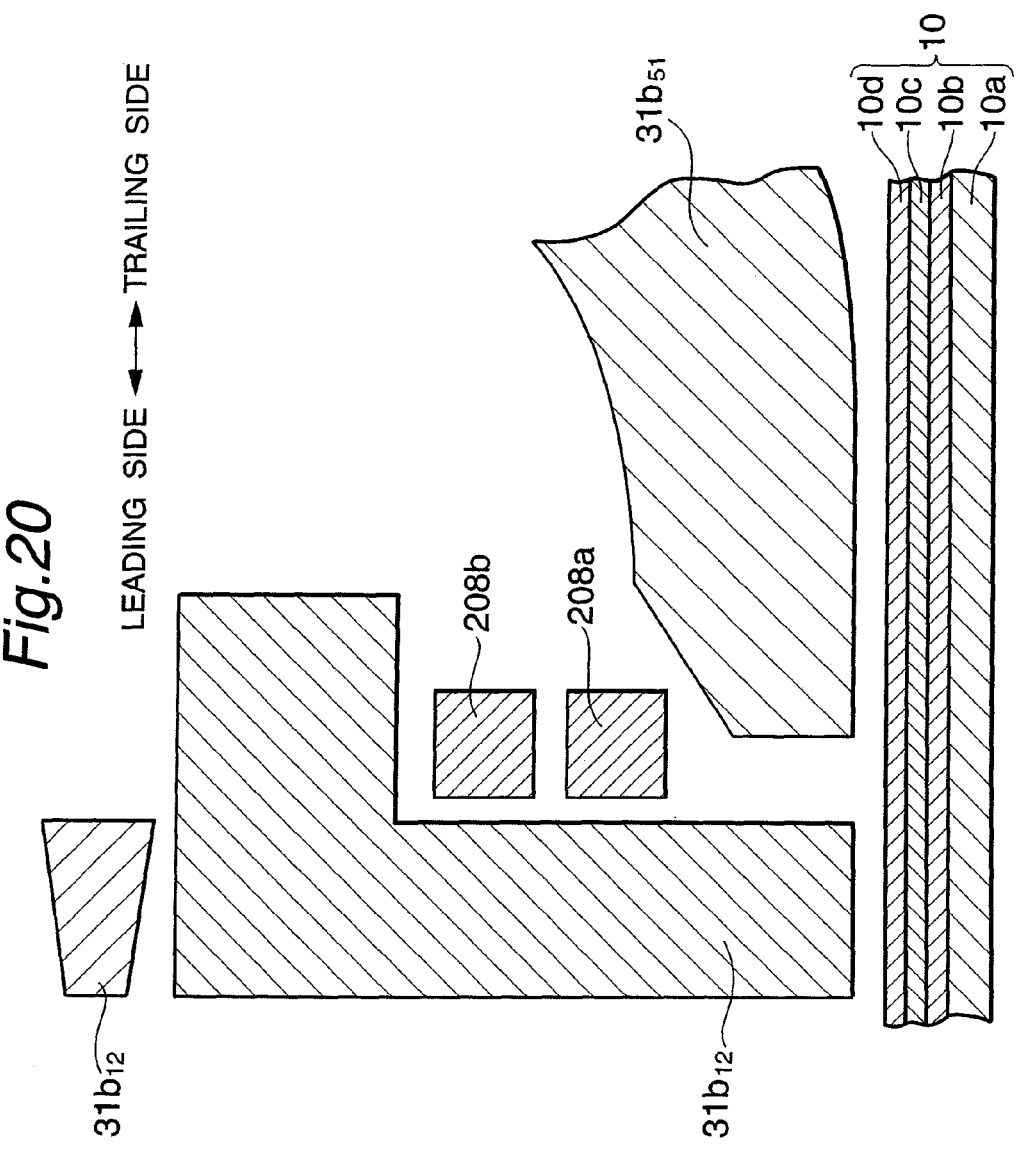

MAGNETIC RECORDING APPARATUS PROVIDED WITH MICROWAVE-ASSISTED HEAD

BACKGROUND OF THE INVENTION

1. Field of the Invention

The present invention relates to a magnetic recording apparatus provided with a microwave-assisted head for writing data signals to a magnetic recording medium having large coercive force to stabilize magnetization.

2. Description of the Related Art

Recently, as the recording density of a magnetic recording apparatus represented by a magnetic disk drive apparatus becomes higher, magnetic particles, constituting a magnetic recording layer of a magnetic recording medium such as a hard disk, have been made fine, improvement of materials and improvement of fine head processing have been achieved, and resultantly surface recording density has been remarkably improved. Further, magnetic recording apparatuses using a perpendicular recording technique are spreading, the recording technique attaining improvement of the surface recording density by magnetizing the recording layer to a direction perpendicular to the surface of a magnetic recording medium, and further improvement of the surface recording density in the future is also expected.

On the other hand, as a record bit or a magnetic particle has been made finer, thermal fluctuation tends to occur. To overcome this fluctuation, it is desirable to use magnetic particles with larger magnetic anisotropy energy and larger coercive force as material of the recording layer, because, when the thermal fluctuation occurs, a signal detected from a read head element of a thin-film magnetic head fluctuates, and resultantly an S/N (signal to noise ratio) is degraded and the signal may be vanished at the worst.

However, when using such magnetic particles with larger magnetic anisotropy energy as the material of the recording layer, the coercive force of the recording layer reaches a large value of 4 kOe or more. When performing saturation magnetic recording, recording magnetic field is generally required to be given by about two times the coercive force, and it has been therefore sometimes difficult to bring the recording layer into the saturation magnetization, that is, to record/erase magnetic data when a magnetic head with conventional performance is used.

For solving this problem, Xiaochun Zhu and Jian-Gang Zhu propose a technique in a document, "Bias-Field-Free Microwave Oscillator Driven by Perpendicularly Polarized Spin Current", IEEE Transactions on Magnetics, Vol. 42, No. 10, pp. 2670-2672, October 2006, such that: an STO (spin torque oscillator) structured with a multilayered magnetic thin film is formed within a gap between a main pole and an auxiliary pole, and oscillation of the STO generates a microwave magnetic field in plane to induce a precession movement of magnetization, to thereby reduce the magnetic field for inversion in magnetization.

This document discloses apparently from dynamic magnetization analysis of the recording layer that the magnetic field for inversion in magnetization can be reduced by 40% with assistance of the microwave. However, the structure of the STO has the following problems:

(1) It is necessary to stack the magnetic thin film by 5 layers or more, which makes processes very complicated;
(2) A magnetic film with very high magnetic anisotropy is required for the STO to oscillate, but such a magnetic film has not yet been attained;
(3) According to this document, it is assumed that oscillation frequency is controlled only by current density fed into the STO and slight change in the current density causes an abrupt change of the oscillation frequency to thereby make the control difficult, and that temperature change also varies largely; and
(4) Control parameters of the microwave magnetic field to be generated are not obvious, and the amount of magnetic field is not also obvious. While the control parameter is assumed to be the current density for supplying energy, adjustment of the current density causes the oscillation frequency to be changed, which results in difficulty of arbitrarily controlling both parameters.

On the other hand, on purpose to more reduce the magnetic field for inversion in magnetization, Zihui Wang and Mingzhong Wu propose in a document, "Chirped-microwave assisted magnetization reversal", Journal of Applied Physics 105, 093903, 2009, such that the microwave frequency is shifted during the inversion in magnetization, that is, a kind of frequency modulation is performed.

According to this document, the following problems occur.
(A) Though the magnetic field for inversion in magnetization is more remarkably reduced compared to the case that the frequency is kept constant, magnetic inversion time is about 2 ns in both cases, which is a large absolute value, and therefore data writing at high speed is difficult (high-speed inversion about 100 ps is required).
(B) When the frequency is shifted, convergence time of the magnetic inversion becomes slightly larger compared to the case that the frequency is kept constant.

SUMMARY OF THE INVENTION

It is therefore an object of the present invention to provide a magnetic recording apparatus provided with a microwave-assisted head capable of writing data to a magnetic recording medium at high speed.

According to the present invention, the magnetic recording apparatus includes a magnetic recording medium having a magnetic recording layer, a thin-film magnetic head with a microwave-band magnetic drive function, the head having a write field generation means that generates a write field to the magnetic recording medium in response to a write signal, and a microwave generator that is provided independent of the write field generation means and generates an alternating magnetic field in plane having a microwave-band frequency when microwave-excitation current is fed, an excitation current generation means that generates the microwave-excitation current by amplitude-modulating microwave carrier current with a modulating signal having a fixed period, and a write signal supply means that generates the write signal and applies it to the write field generation means of the thin-film magnetic head.

The microwave carrier current is amplitude-modulated by the modulating signal having a fixed period, and the microwave-excitation current is fed into the microwave generator to thereby generate the alternating magnetic field in plane having a microwave-band frequency. Since the microwave-excitation current thus amplitude-modulated is applied to the microwave generator, the generated alternating magnetic field in plane, namely, a microwave resonance magnetic field in an in-plane direction can be so set as to become smallest in the amplitude at starting times and end times of rising or falling of the write field flux. This setting lowers the flux level for every inversion in magnetization, which can function so as to forcibly end the precession movement. As a result, convergence time of inversion in magnetization can be reduced and high-speed data writing can be achieved. Moreover, the instantaneous maximum power for inducing the precession movement can be also increased.

According to the present invention, it is, of course, possible to write data signals into the magnetic recording medium having large coercive force with high precision without heating. Thus, at the time of writing, a main pole applies a perpendicular magnetic field toward the surface of the magnetic recording medium, and the resonance magnetic field (high-frequency magnetic field of a microwave band having a ferromagnetic resonance frequency $F_R$ or its near frequency of the magnetic recording layer of the magnetic recording medium) is generated in a longitudinal direction (an in-plane or almost in-plane direction of the surface of the magnetic recording medium, and a track direction), which is a direction orthogonal to the perpendicular magnetic field. This resonance magnetic field is applied to the magnetic recording layer, and induces the precession movement of medium magnetization, to thereby lower the coercive force of the magnetic recording layer effectively. This can remarkably reduce the write field intensity required for writing in the perpendicular direction (a direction perpendicular or nearly perpendicular to the outer surface of the magnetic recording layer).

Here, some terms used in the specification will be defined as in the following. In a layered structure of elements formed on an element-formed surface of a substrate, a structural element that is in a substrate side of a reference layer is defined to be "below" or "lower" in relation to the reference layer, and a structural element that is in a stacking direction side of the reference layer is defined to be "above" or "upper" in relation to the reference layer. For example, "a lower magnetic layer is above an insulation layer" means that the lower magnetic layer is in the stacking direction side of the insulation layer.

It is preferable that the modulating signal is one having a fixed period corresponding to the rising or falling time of the write field flux.

In this case, it is more preferable that the microwave-excitation current is one that has the minimum amplitude at starting times and end times of rising or falling of the write field flux and has the maximum amplitude in the middle between the starting time and the end time.

It is also preferable that the excitation current generation means is configured to generate a suppressed-carrier single sideband (SSB) of the microwave-excitation current.

It is also preferable that the thin-film magnetic head includes a write head element of a perpendicular magnetic recording type, the write head element having a main pole, an auxiliary pole, and a coil means wound passing between the main pole and the auxiliary pole, and that the write field generation means corresponds to the coil means, and the microwave generator is arranged between the main pole and the auxiliary pole. In the write head element of a perpendicular magnetic recording type, the strongest write field is generated at the end in the auxiliary pole side of the top end of the main pole, and therefore, by disposing a line conductor as a microwave radiator at this position, the microwave-band resonance magnetic field can be applied to the magnetic recording medium more effectively.

It is also preferable that the magnetic recording apparatus is a magnetic record and reproduction apparatus and the thin-film magnetic head further includes a tunnel magnetoresistive effect (TMR) read head element or a giant magnetoresistive effect (GMR) read head element.

It is also preferable that the microwave generator radiates a microwave-band resonance magnetic field having a ferromagnetic resonance frequency $F_R$ or its near frequency of the magnetic recording medium when the microwave-excitation current is fed.

It is also preferable that the maximum value of the alternating magnetic field in plane is smaller than the maximum value of the write field.

It is also preferable that, in a position of the magnetic recording layer of the magnetic recording medium, the write field is established so as to have a direction perpendicular or nearly perpendicular to the outer surface of the magnetic recording layer, and the alternating magnetic field in plane is established so as to have an in-plane or nearly in-plane direction of the outer surface of the magnetic recording layer.

Further objects and advantages of the present invention will be apparent from the following description of the preferred embodiments of the invention as illustrated in the accompanying drawings.

BRIEF DESCRIPTION OF THE DRAWINGS

FIG. 17 is a sectional view schematically showing the structure of a write head element portion of a thin-film magnetic head in yet another embodiment of the magnetic record and reproduction apparatus according to the present invention and the structure of the magnetic disk opposed to the thin-film magnetic head;

FIG. 18 is a sectional view schematically showing the structure of a write head element portion of a thin-film magnetic head in still another embodiment of the magnetic record and reproduction apparatus according to the present invention and the structure of the magnetic disk opposed to the thin-film magnetic head;

FIG. 19 is a sectional view schematically showing the structure of a write head element portion of a thin-film magnetic head in yet a further embodiment of the magnetic record and reproduction apparatus according to the present invention and the structure of the magnetic disk opposed to the thin-film magnetic head; and FIG. 20 is a sectional view schematically showing the structure of a write head element portion of a thin-film magnetic head in another embodiment of the magnetic record and reproduction apparatus according to the present invention and the structure of the magnetic disk opposed to the thin-film magnetic head.

DESCRIPTION OF THE PREFERRED EMBODIMENTS

Figure 1:
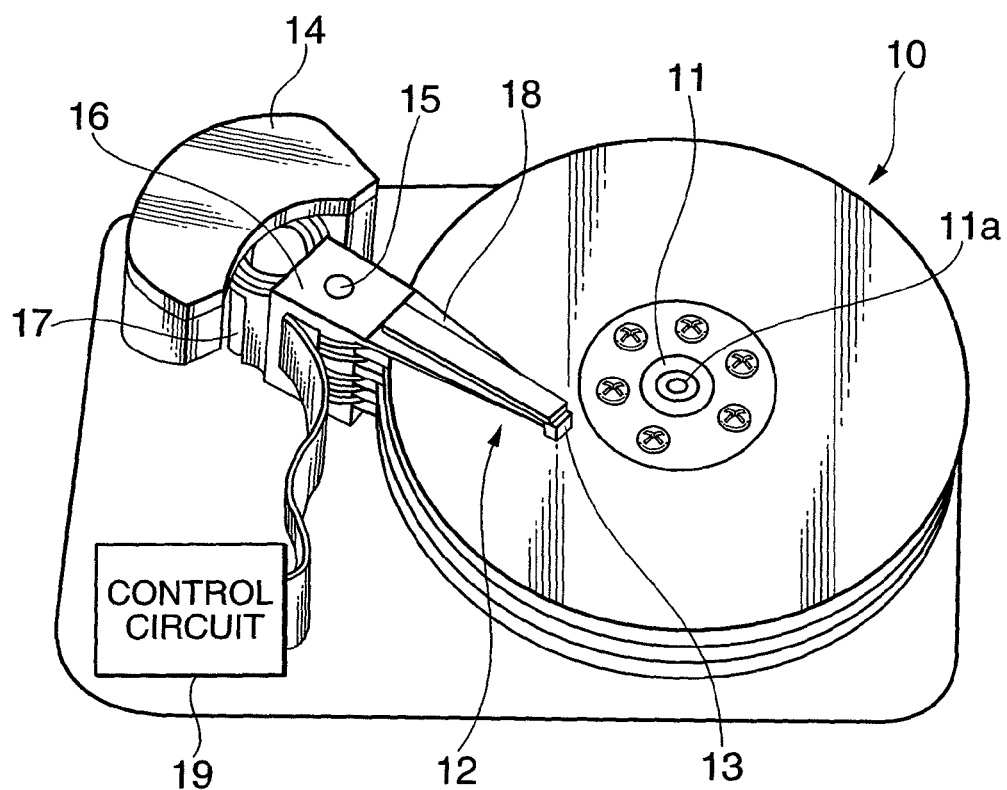
FIG. 1 is a perspective view schematically showing the structure of a major portion of one embodiment of a magnetic record and reproduction apparatus according to the present invention.

Hereinafter, one embodiment of the present invention will be described in detail with reference to the accompanying drawings. In each of the drawings, the same elements are designated with the same reference numerals. Dimensional proportions both in a structural element and between structural elements in the drawing are arbitrary for easy viewing of the drawings.

Figure 2:
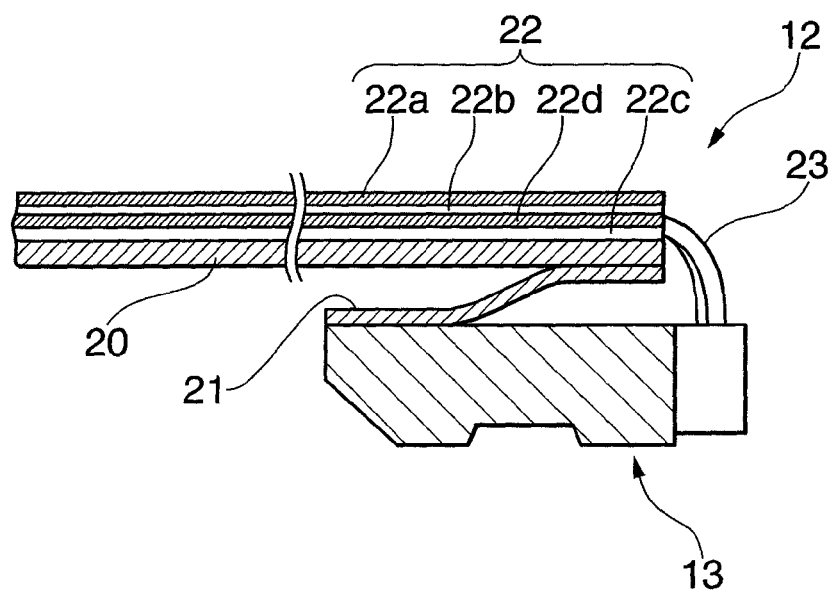
FIG. 2 is a sectional view showing the part of an HGA in the magnetic record and reproduction apparatus shown in FIG. 1.

FIG. 1 schematically shows the structure of a major portion of one embodiment of a magnetic record and reproduction apparatus according to the present invention, and FIG. 2 shows the part of an HGA in the magnetic record and reproduction apparatus of FIG. 1.

FIG. 1 shows a magnetic disk drive apparatus as the magnetic record and reproduction apparatus. In the drawing, reference numeral 10 indicates a plurality of magnetic disks rotating around a rotational axis 11a with a spindle motor 11, 12 indicates an HGA for making a thin-film magnetic head, namely, a magnetic head slider 13 properly opposed to the surface of each magnetic disk 10, the thin-film magnetic head for writing and reading data signals to/from the magnetic disk 10, and 14 indicates an assembly carriage device for positioning the magnetic head slider 13 on a track of the magnetic disk 10, respectively.

Figure 7:
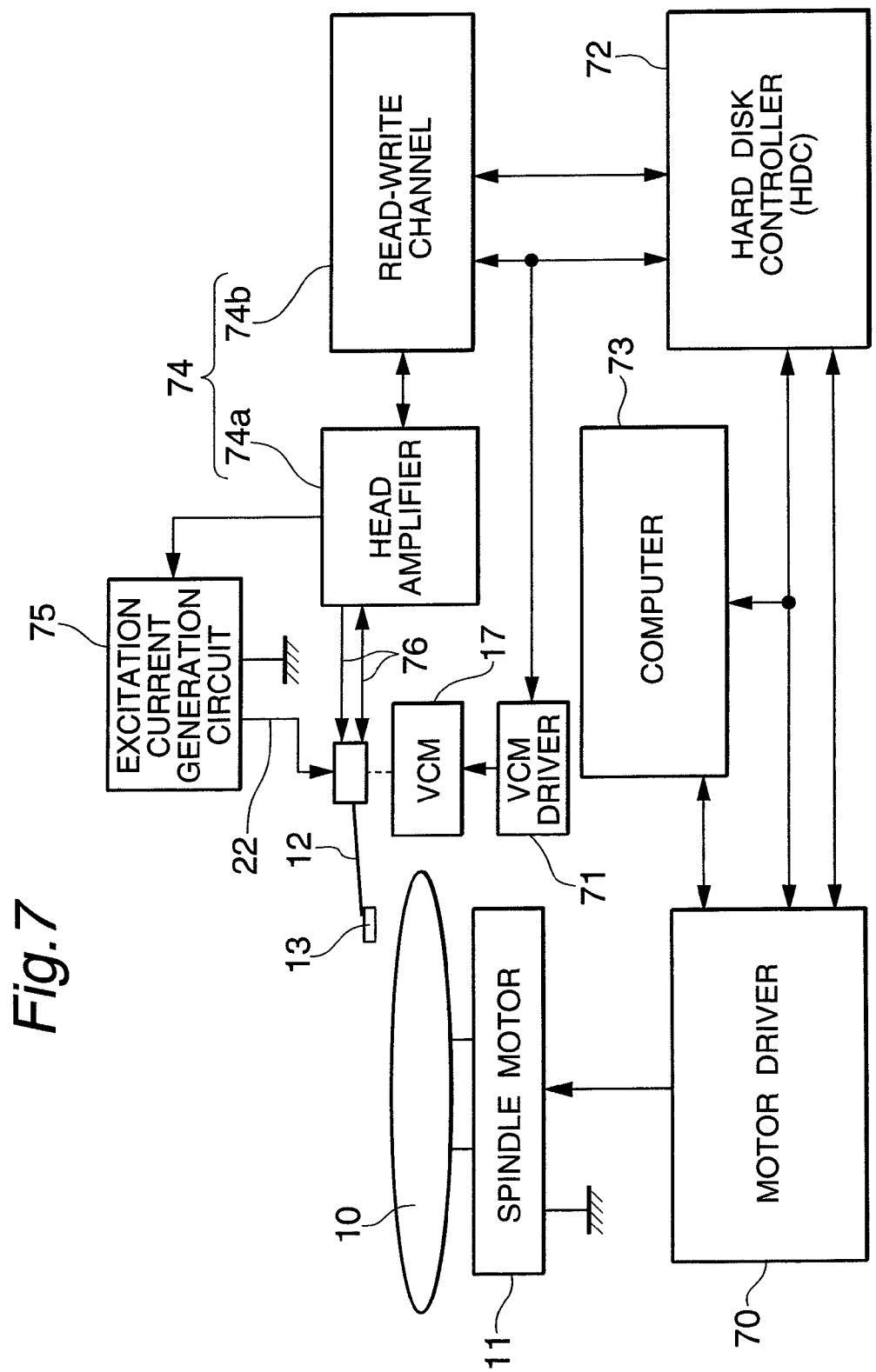
FIG. 7 is a block diagram schematically showing the electrical configuration of a magnetic disk drive apparatus in the embodiment of FIG. 1.

The assembly carriage device 14 includes primarily a carriage 16 rotatable around a pivot bearing axis 15, and, for example, a voice coil motor (VCM) 17 for rotatably driving the carriage 16. The proximal ends of a plurality of drive arms 18 are attached to the carriage 16, the arms 18 stacked in the direction along the pivot bearing axis 15, and each drive arm 18 has the HGA 12 fixed to the distal end. Meanwhile, the magnetic record and reproduction apparatus may have single magnetic disk 10, single drive arm 18 and single HGA 12. As shown in FIG. 7, the magnetic disk 10 is grounded through the spindle motor 11 and the rotational axis 11a.

Further in FIG. 1, numeral 19 indicates a record/reproduction and resonance control circuit for not only controlling read and write operations of the thin-film magnetic head 13 but also controlling the microwave-excitation current for ferromagnetic resonance, which will be described later.

As shown in FIG. 2, the HGA 12 includes the thin-film magnetic head 13, a load beam 20 and a flexure 21 of metal conductive material for supporting the thin-film magnetic head 13, and an excitation-current wiring member 22 that is a transmission line for feeding the microwave-excitation current. Further, the HGA 12 also has a wiring member for head elements, though not shown, for feeding the write current to be applied to the write head element of the magnetic head 13 and for taking out a read output voltage while applying constant current to the read head element.

The thin-film magnetic head 13 is attached to one end of the flexure 21 having elasticity. The flexure 21 and the load beam 20, which is attached to the other end of the flexure, constitute a suspension to support the thin-film magnetic head 13.

The excitation-current wiring member 22 is provided with a strip line having ground conductors above and below the line covering almost entire portion of the full length. That is, as shown in FIG. 2, a conductor line 22d of, for example, copper (Cu) is sandwiched between the load beam 20 constituting a lower ground conductor and an upper ground conductor 22a with intervention of dielectric layers 22b and 22c formed of dielectric material such as polyimide. One strip line is formed as the excitation-current wiring member 22 in parallel with the surface of the load beam (when the microwave circuit is an unbalanced structure). The end of the strip line on the magnetic head side is connected to a terminal electrode by wire bonding with use of a wire 23 in the present embodiment. On the other hand, though not shown, the wiring members for the write head element and the read head element are formed of normal lead conductors, and the ends are, in the embodiment, connected to terminal electrodes of the write head element and the read head element by wire bonding, respectively. Ball bonding may be employed without using the wire bonding for connecting the wiring members with the terminal electrodes.

Figure 3:
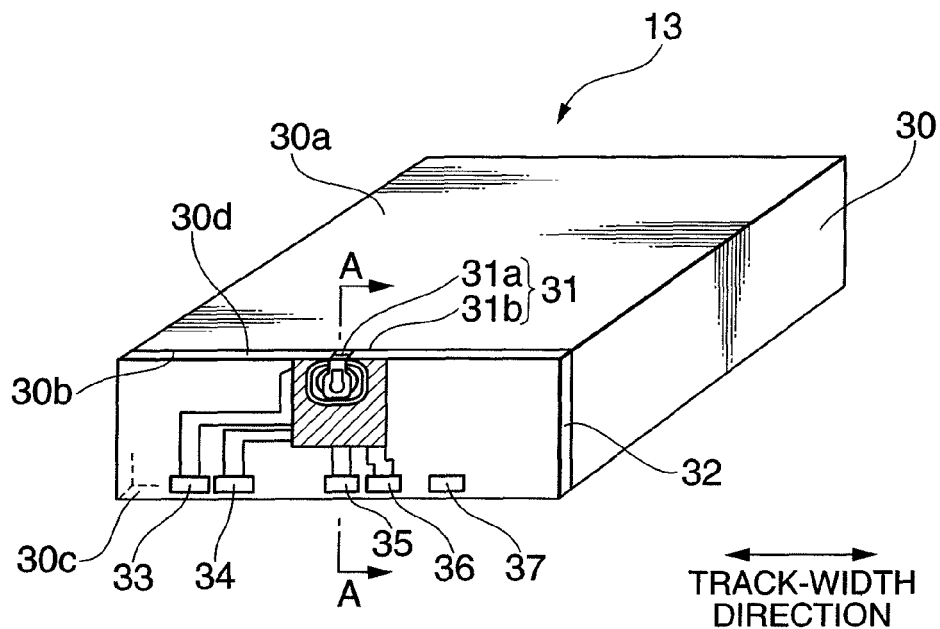
FIG. 3 is a perspective view schematically showing the whole of a thin-film magnetic head in the embodiment of FIG. 1.

FIG. 3 schematically shows the whole of the thin-film magnetic head 13 in the embodiment.

As shown in the drawing, the thin-film magnetic head 13 includes a slider substrate 30 having an ABS 30a so as to obtain an appropriate flying height, a magnetic head element 31 provided on an element-formed surface 30b which is perpendicular to the ABS 30a and corresponds to one side surface when the ABS 30a is considered to be a bottom surface, a protection layer 32 provided on the element-formed surface 30b to cover the magnetic head element 31, and terminal electrodes 33, 34, 35, 36 and 37 exposed from the layer surface of the protection layer 32.

The magnetic head element 31 includes chiefly a magnetoresistive (MR) effect read head element 31a for reading data signals from the magnetic disk, and an inductive write head element 31b for writing data signals to the magnetic disk. The terminal electrodes 33 and 34 are electrically connected to the MR read head element 31a, the terminal electrodes 35 and 36 are electrically connected to the inductive write head element 31b, and the terminal electrode 37 is electrically connected to one end of a line conductor 38 (FIG. 5) as a microwave generator to be described late. The other end of the line conductor 38 is connected to the ground (in case of an unbalanced structure).

The terminal electrodes 33, 34, 35, 36 and 37 are not limited to the positions shown in FIG. 3, and may be provided at any positions with any arrangement on the element-formed surface 30b. For example, the terminals may be provided on a slider end surface 30c that is a surface opposite to the ABS 30a. Moreover, when a heater is provided for adjusting the flying height, there is provided terminals to be electrically connected to the heater.

One end of each of the MR read head element 31a and the inductive write head element 31b reaches a slider end surface 30d that is a surface of the ABS 30a side. Here, the slider end surface 30d is a surface except the ABS 30a out of an opposed-to-medium surface, opposed to the magnetic disk, in the thin-film magnetic head 13, and chiefly composed of an end surface of the protection layer 32. One ends of these MR read head element 31a and inductive write head element 31b are opposed to the magnetic disk, whereby reading of data signals by sensing the signal field and writing data signals by applying the signal field can be performed. Moreover, one end of each element reaching the slider end surface 30d and its vicinity may be coated for protection with very thin diamond-like carbon (DLC), for example.

Figure 4:
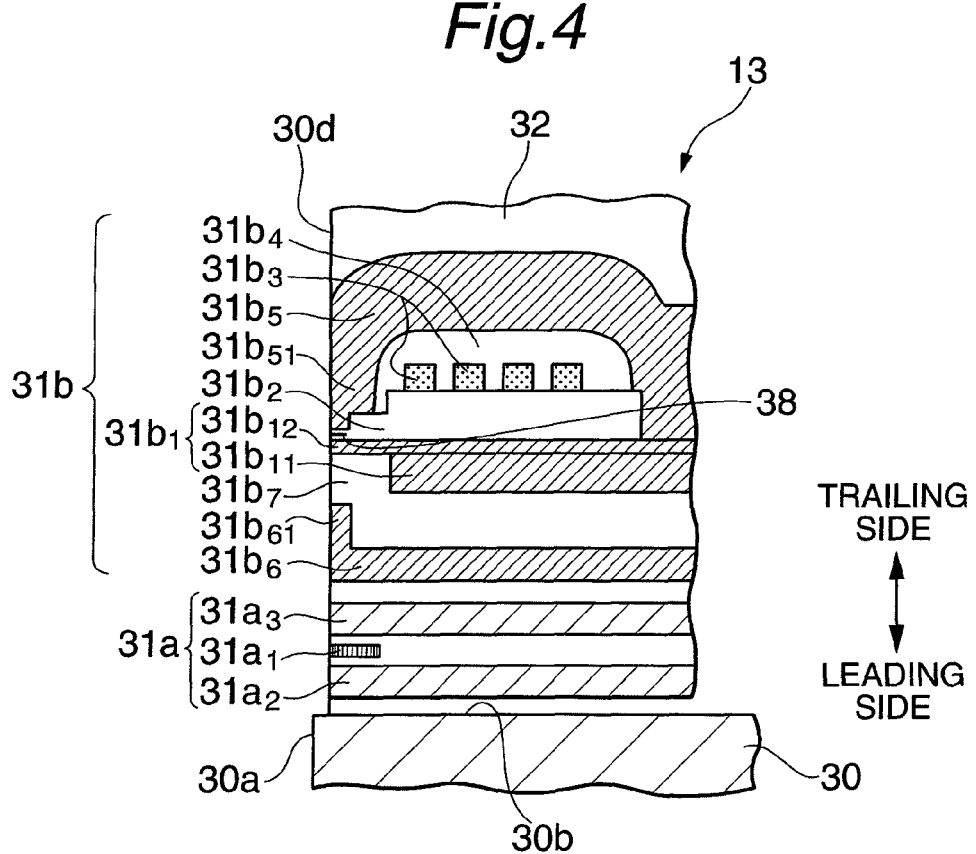
FIG. 4 is a cross-sectional view taken along the line A-A in FIG. 3 schematically showing the whole of the thin-film magnetic head in the embodiment of FIG. 1.
Figure 5:
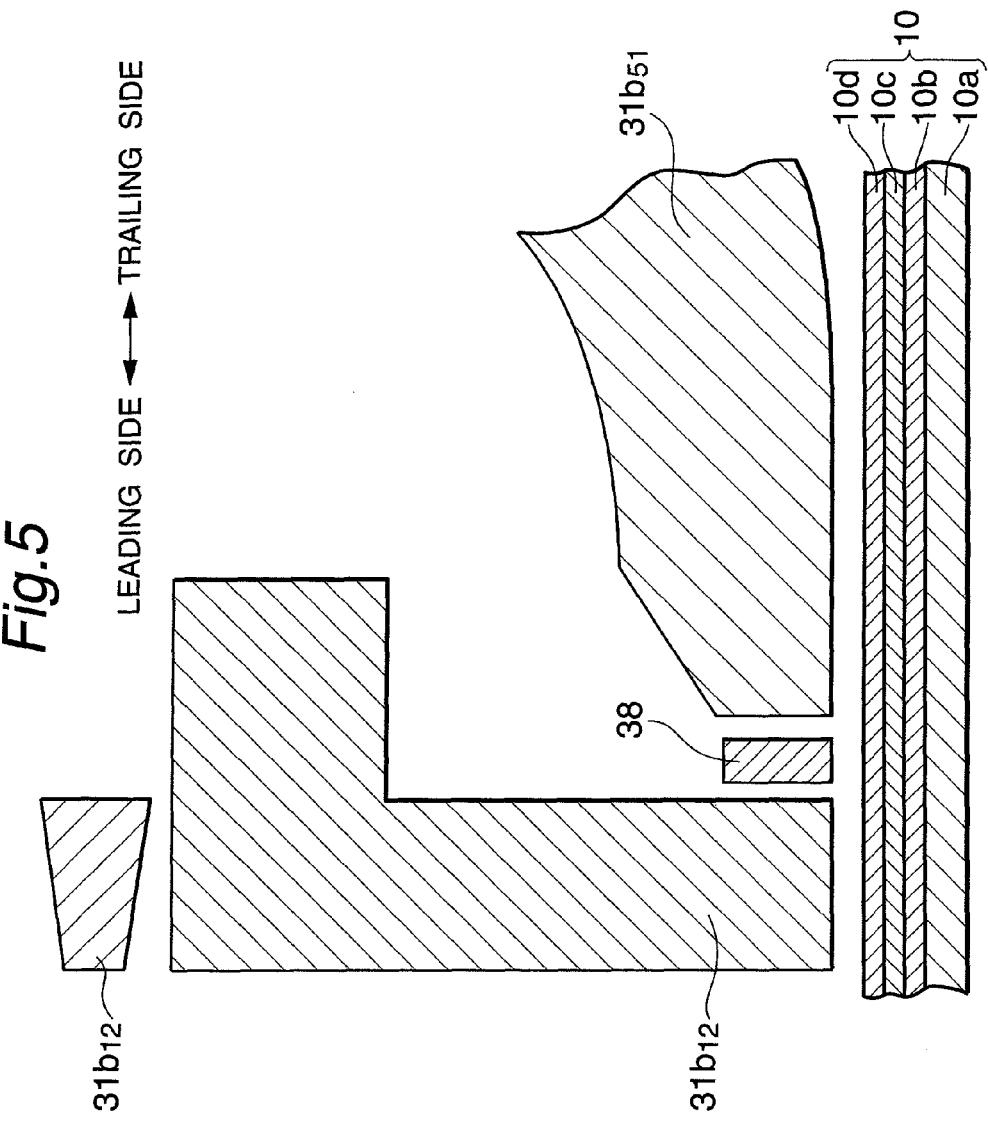
FIG. 5 is a sectional view schematically showing the structure of a write head element portion of the thin-film magnetic head in the embodiment of FIG. 1 and the structure of a magnetic disk opposed to the thin-film magnetic head.
Figure 6:
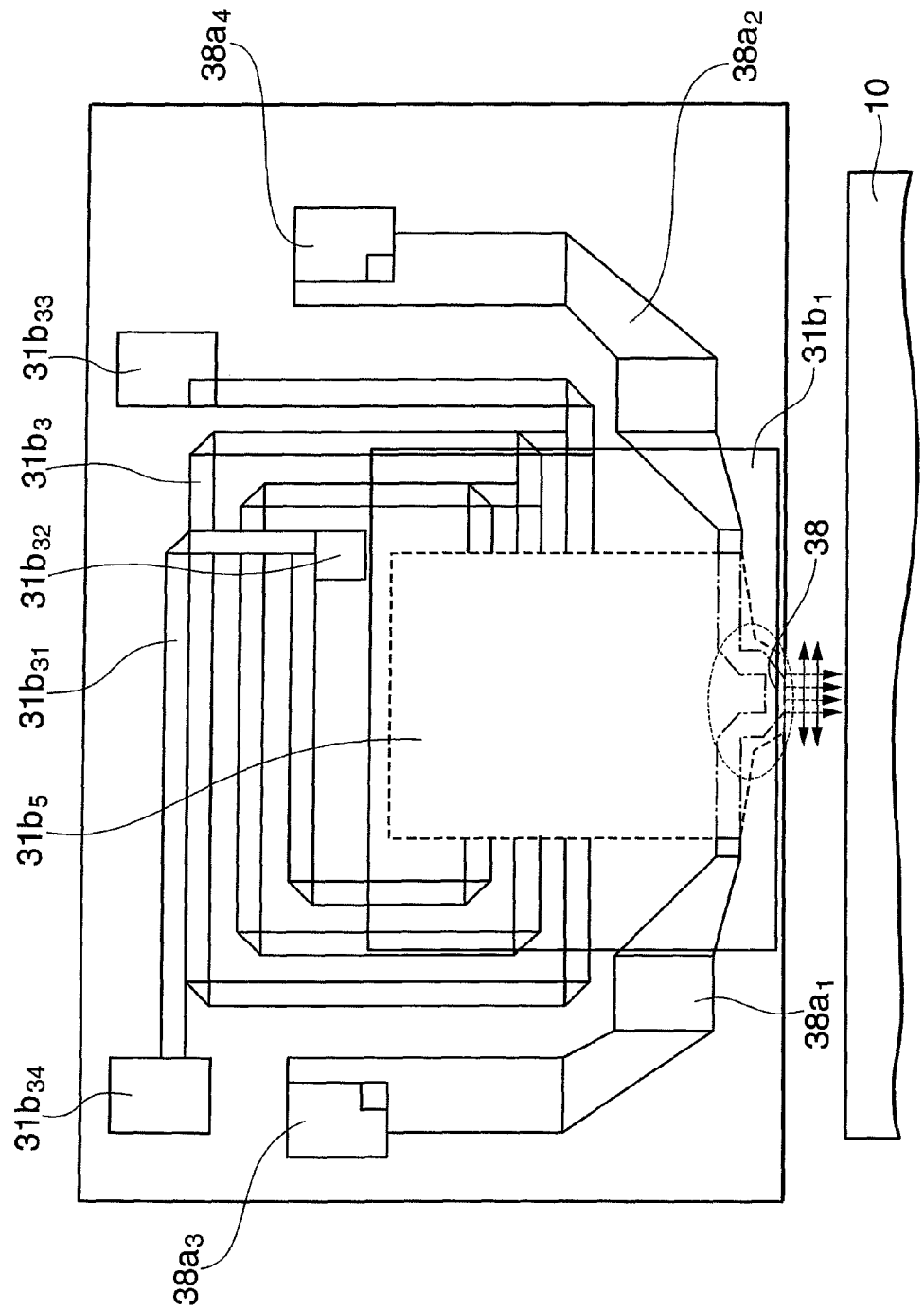
FIG. 6 shows the structure of a part of the thin-film magnetic head in the embodiment of FIG. 1 viewed from an upper side relative to a substrate.

FIG. 4 schematically shows the whole of the thin-film magnetic head 13 in the embodiment and shows a cross-sectional view taken along the line A-A in FIG. 3, FIG. 5 schematically shows the structure of the write head element portion of the thin-film magnetic head 13 in the embodiment and the structure of the magnetic disk opposed to the thin-film magnetic head, and FIG. 6 shows the structure of a part of the thin-film magnetic head 13 in the embodiment in a state of being viewed from the upper side relative to the substrate. Here, FIG. 5 diagramatically shows only a main pole layer, an auxiliary layer and the line conductor of the write head element, with a left side presented as a leading side and a right side as a trailing side in the drawing.

In FIGS. 4 and 5, numeral 30 indicates a slider substrate made of Al—Tic (Al$_2$O$_3$—TiC), etc. having the ABS 30a opposed to the surface of the magnetic disk 10. On the element-formed surface 30b of the slider substrate 30, there are chiefly formed the MR read head element 31a, the inductive write head element 31b, the line conductor (strip line) 38 formed within the inductive write head element 31b, and the protection layer 32 covering these elements.

The MR read head element 31a includes an MR multi-layered structure $31a_1$, a lower shield layer $31a_2$ and an upper shield layer $31a_3$ disposed in positions sandwiching the multi-layered structure. The MR multi-layered structure $31a_1$ includes a current-in-plane type (CIP) GMR multilayer, a current-perpendicular-to-plane type (CPP) multilayer, or a TMR multilayer, and senses signal fields from the magnetic disk with extremely high sensitivity. The lower shield layer $31a_2$ and the upper shield layer $31a_3$ prevent the MR multi-layered structure $31a_1$ from being affected by external magnetic fields that may cause noise.

When the MR multi-layered structure $31a_1$ includes the CIP-GMR multilayer, lower and upper shield gap layers for insulation are provided in respective positions between each of the lower shield layer $31a_2$ and the upper shield layer $31a_3$ and the MR multi-layered structure $31a_1$. Further, an MR lead conductive layer is formed for supplying sense current to the MR multi-layered structure $31a_1$ and bringing out reproduction output. On the other hand, when the MR multi-layered structure $31a_1$ includes the CPP-GMR multilayer, or the TMR multilayer, the lower shield layer $31a_2$ and the upper shield layer $31a_3$ function also as lower and upper electrode layers, respectively. In this case, the lower and upper shield gap layers and the MR lead conductive layer are unnecessary. Moreover, on both sides in a track-width direction of the MR multi-layered structure $31a_1$, there are formed, though not shown, insulation layers, or bias insulation layers and hard bias layers for applying a longitudinal magnetic bias field to stabilize the magnetic domain structure.

When the MR multi-layered structure $31a_1$ includes, for example, the TMR multilayer, the structure $31a_1$ includes an anti-ferromagnetic layer made of, for example, iridium manganese (IrMn), platinum manganese (PtMn), nickel manganese (NiMn), or ruthenium rhodium manganese (RuRhMn), with thickness of about 5-15 nm, and a three-layer film having a nonmagnetic metal film of ruthenium (Ru) or the like sandwiched by two ferromagnetic layers made of, for example, cobalt iron (CoFe). The structure $31a_1$ has a sequentially stacked structure including a magnetization fixed layer where the magnetization direction is fixed by the anti-ferromagnetic layer, a tunnel barrier layer made of an oxidized nonmagnetic dielectric material film made by oxidizing a metal film of, for example, aluminum (Al), aluminum copper (AlCu) or magnesium (Mg) with thickness of about 0.5-1 nm with oxygen introduced into a vacuum chamber, or by natural oxidation, and a magnetization free layer including two layered films of, for example, CoFe with thickness of about 1 nm and nickel iron (NiFe) with thickness of about 3-4 nm as ferromagnetic materials, and effecting tunnel exchange coupling with the magnetization fixed layer through the tunnel barrier layer.

Each of the lower shield layer $31a_2$ and the upper shield layer $31a_3$ is formed of, for example, NiFe (permalloy), cobalt iron nickel (CoFeNi), CoFe, iron nitride (FeN) or iron zirconium nitride (FeZrN) or the multilayer with thickness of, for example, about 0.1-3 um by using, for example, a pattern plating method including a frame plating method.

The inductive write head element 31b is for perpendicular magnetic recording, and includes a main pole layer $31b_1$ acting as the main pole that generates the write field from the end portion in its own ABS 30a (slider end surface 30d) side when writing data signal, a trailing gap layer $31b_2$, a write coil $31b_3$ that has a spiral shape and is formed so as to pass through at least between the main pole layer and an auxiliary pole layer during one turn, a write coil insulation layer $31b_4$, an auxiliary pole layer $31b_5$ as the auxiliary pole where the end portion separated apart in the ABS 30a (slider end surface 30d) side is magnetically connected to the main pole layer $31b_1$, an auxiliary shield layer $31b_6$ acting as auxiliary shield, and a leading gap layer $31b_7$.

The main pole layer $31b_1$ acts as a magnetic path to converge and guide the magnetic flux, which is generated by applying write current to the write coil $31b_3$, to the magnetic recording layer of the magnetic disk to be recorded, and includes a main pole yoke layer $31b_{11}$ and a main pole principal layer $31b_{12}$. The length (thickness) in a layer-thickness direction of the end portion in the ABS 30a (slider end surface 30d) side of the main pole layer $31b_1$ corresponds to the layer thickness of the main pole principal layer $31b_{12}$ only and becomes small. As a result, when writing data signals, the main pole layer can generate from the end portion a fine magnetic field corresponding to higher density recording. The main pole yoke layer $31b_{11}$ and the main pole principal layer $31b_{12}$ are formed of, for example, NiFe, CoFeNi, CoFe, FeN or FeZrN or the multilayer with thickness of approximately 0.5-3.5 um and thickness of approximately 0.1-1 um, respectively, by using, for example, a pattern plating method including a sputtering method and a frame plating method.

The auxiliary pole layer $31b_5$ and the auxiliary shield layer $31b_6$ are arranged at the trailing side and the leading side relative to the main pole layer $31b_1$, respectively. The auxiliary pole layer $31b_5$ is, as described above, magnetically connected to the main pole layer $31b_1$ in the end portion separated apart in the ABS 30a (slider end surface 30d) side, but the auxiliary shield layer $31b_6$ is not magnetically connected to the main pole layer $31b_1$ in the present embodiment.

The auxiliary pole layer $31b_5$ and the auxiliary shield layer $31b_6$ have a trailing shield portion $31b_{51}$ and a leading shield portion $31b_{61}$, respectively, each having a layer cross-section wider than the other portions in the end portion of the slider end surface $30d$ side. The trailing shield portion $31b_{51}$ is opposed to the main pole layer $31b_1$ in the end portion of the slider end surface $30d$ side with the trailing gap layer $31b_2$ intervened. The leading shield portion $31b_{61}$ is opposed to the main pole layer $31b_1$ in the end portion of the slider end surface $30d$ side with the leading gap layer $31b_7$ intervened. By providing the trailing shield portion $31b_{51}$ and the leading shield portion $31b_{61}$, a write-field magnetic field gradient between the trailing shield portion $31b_{51}$ and the end of the main pole layer $31b_1$, and between the end of the leading shield portion $31b_{61}$ and the end of the main pole layer $31b_1$ becomes steeper due to the shunt effect of magnetic flux. As a result, a jitter of a signal output becomes smaller, and therefore, an error rate at the time of reading can be decreased.

Here, it is also possible to give what is called side-surface shielding by properly processing the auxiliary pole layer $31b_5$ or the auxiliary shield layer $31b_6$ and arranging a part of the auxiliary pole layer $31b_5$ or the auxiliary shield layer $31b_6$ at the vicinity of both sides of the main pole layer $31b_1$ in the track width direction. This case increases the shunt effect of magnetic flux.

It is preferable that the length (thickness) of the trailing shield portion $31b_{51}$ and the leading shield portion $31b_{61}$ in the layer-thickness direction may be set to several ten to several hundred times the thickness of the main pole layer $31b_1$ in the same direction. It is preferable that the gap length of the trailing gap layer $31b_2$ is about 10-100 nm, and more preferable that the gap length is about 20-50 nm. Further, it is preferable that the gap length of the leading gap layer $31b_7$ is 0.1 μm or more.

Each of the auxiliary pole layer $31b_5$ and the auxiliary shield layer $31b_6$ is formed of, for example, NiFe, CoFeNi, CoFe, FeN or FeZrN, or the like, with thickness of approximately 0.5-4 um by using, for example, a pattern plating method including a frame plating method. Each of the trailing gap layer $31b_2$ and the leading gap layer $31b_7$ is formed of, for example, alumina ($Al_2O_3$), silicon dioxide ($SiO_2$), aluminum nitride (AlN) or DLC, with thickness of about 0.1-3 um by using, for example, a sputtering method, CVD method or the like.

As shown in FIG. 6, to the write coil $31b_3$, there is fed write signals through a lead conductor $31b_{31}$ and via-hole conductors $31b_{32}$, $31b_{33}$, $31b_{34}$ and the like. The write coil insulation layer $31b_4$ is provided so as to enclose the write coil $31b_3$ for electrically insulating the write coil $31b_3$ from surrounding magnetic layers. The write coil $31b_3$ is formed of, for example, Cu film by using a frame-plating method, a sputtering method and the like with thickness of about 0.1-5 um. The lead conductor $31b_{31}$ and via-hole conductors $31b_{32}$, $31b_{33}$, $31b_{34}$ are also formed of, for example, Cu film by using a frame-plating method, a sputtering method and the like. The write coil insulation layer $31b_4$ is formed of, for example, a heat-cured photoresist by using a photolithography method with thickness of about 0.5-7 um.

As shown in FIG. 4 to FIG. 6, in the present embodiment, a line conductor (sub coil) 38 is formed between the main pole principal layer $31b_{12}$ of the main pole layer $31b_1$ and the trailing shield portion $31b_{51}$ of the auxiliary pole layer $31b_5$. The line conductor 38 cooperates with the main pole layer $31b_1$ and the auxiliary pole layer $31b_5$, which constitute ground conductors, and constitutes a strip line. The end of the line conductor 38 in the ABS side is positioned on the same plane as the ends of the main pole principal layer $31b_{12}$ of the main pole layer $31b_1$ and the trailing shield portion $31b_{51}$ of the auxiliary pole layer $31b_5$ in the ABS side, or on a position retracted from the plane to a direction opposite to the ABS. The end of the line conductor 38 in the side opposite to the ABS is positioned on the same plane as the end of the trailing shield portion $31b_{51}$ of the auxiliary pole layer $31b_5$ in the side opposite to the ABS, or on a position advanced from the plane toward the ABS direction. In the embodiment, the length of the line conductor 38 in the track-width direction is equal or larger to or than the length of the main pole principal layer $31b_{12}$ of the main pole layer $31b_1$ in the track-width direction. The microwave-excitation current is fed to the line conductor 38 through lead conductors $38a_1$ and $38a_2$, and via-hole conductors $38a_3$ and $38a_4$. The line conductor 38, lead conductors $38a_1$ and $38a_2$, and via-hole conductors $38a_3$ and $38a_4$ are formed of Cu film or the like by using, for example, a sputtering method. One end of the line conductor 38 is grounded through the lead conductors and the via-hole conductors, or terminated with a resistor, not shown, equivalent to the characteristic impedance of the strip line, and the other end is connected to an excitation current generation circuit 75 to be described later (FIG. 7) through the lead conductors and the via-hole conductors. Of course, the line conductor 38 may be formed of a multilayer.

As shown in FIG. 5, the magnetic disk 10 is for perpendicular magnetic recording, and has a multilayered structure with the following layers sequentially stacked on a disk substrate, not shown, the layers including: a soft magnetic layer $10a$ that consists of a soft magnetic rear layer acting as a part of a magnetization orientation film and magnetic-flux loop circuit, an intermediate layer $10b$, a magnetic recording layer $10c$, and a conductive overcoat layer $10d$. All layers including the disk substrate are formed of conductive materials. The magnetization orientation film gives magnetic anisotropy to the soft magnetic rear layer in the track width direction, so that the magnetic domain structure of the soft magnetic rear layer is stabilized and spike noise in a reproduced output wave is suppressed. The intermediate layer $10b$ acts as an undercoat layer to control the magnetization orientation and the particle size of the magnetic recording layer $10c$.

Here, the disk substrate is formed of an aluminum alloy coated with nickel phosphorus (NiP), silicon (Si), etc. The magnetization orientation film is formed of anti-ferromagnetic material such as PtMn. The soft magnetic rear layer is formed of soft magnetic material including a cobalt (Co) amorphous alloy such as a cobalt-zirconium-niobium (CoZrNb) alloy, a ferrous (Fe) alloy, and soft magnetic ferrite, or a multilayer of soft-magnetic film/nonmagnetic film, or the like. The intermediate layer $10b$ is formed of nonmagnetic material such as a Ru alloy. Here, the intermediate layer $10b$ may be formed of other nonmagnetic metal or alloy, or a low magnetic-permeability alloy, as long as they can control perpendicular magnetic anisotropy of the magnetic recording layer $10c$. The overcoat layer $10d$ is formed of material, carbon (C) or the like using a chemical vapor deposition (CVD) process or the like.

The magnetic recording layer $10c$ is formed of, for example, cobalt-chromium-platinum (CoCrPt) alloy, CoCrPt—SiO2, ferrous platinum (FePt) alloy, or an artificial grid multilayer or a patterned film made of CoPt/palladium (Pd) alloy. Moreover, it is preferable that the perpendicular magnetic anisotropy energy of the recording layer $10c$ is adjusted to, for example, $1\times10^6$ erg/cc (0.1 J/m$^3$) or more to control the thermal fluctuation of magnetization. In this case, the coercive force of the recording layer $10c$ becomes, for example, approximately 5 kOe (400 kA/m) or more. Moreover, the ferromagnetic resonance frequency $F_R$ of the recording layer 10c is a specific value determined by the shape, size, constituent elements, etc, of magnetic particles constituting the recording layer 10c. The frequency $F_R$ is approximately 40 GHz. In one case, only one resonance frequency $F_R$ exists, and plural ones exist in the other case as in the case that spin-wave resonance occurs.

Figure 8:
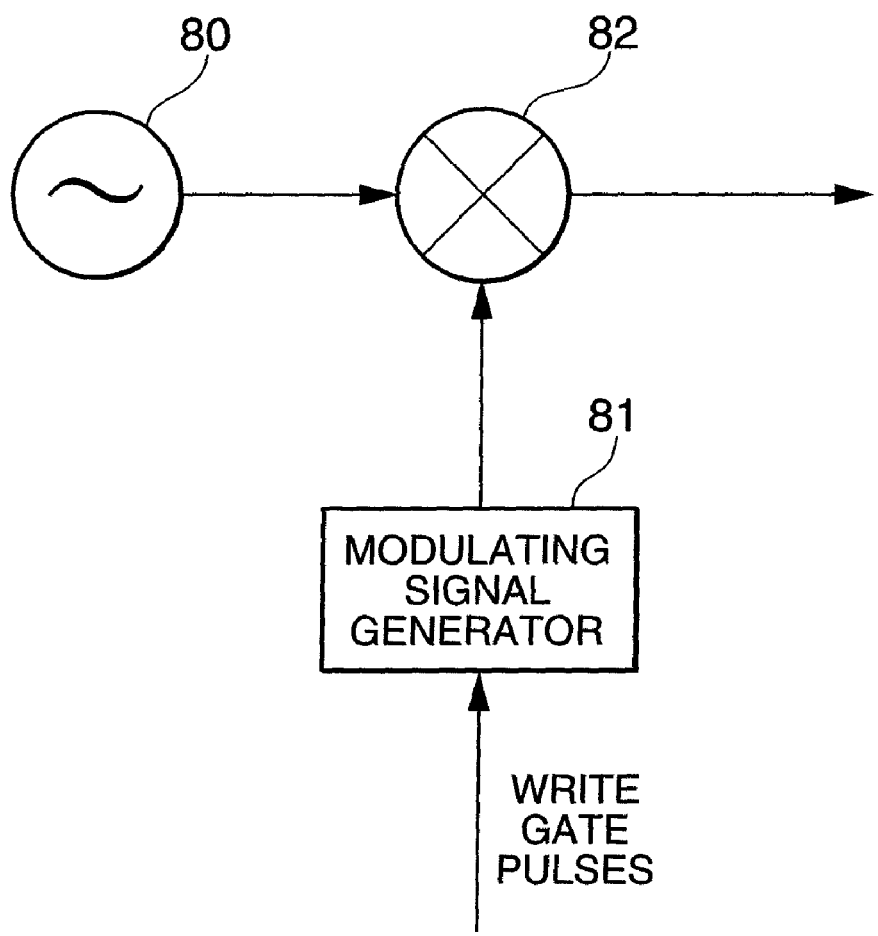
FIG. 8 is a block diagram schematically showing the configuration of an excitation current generation circuit shown in FIG. 7.
Figure 9:
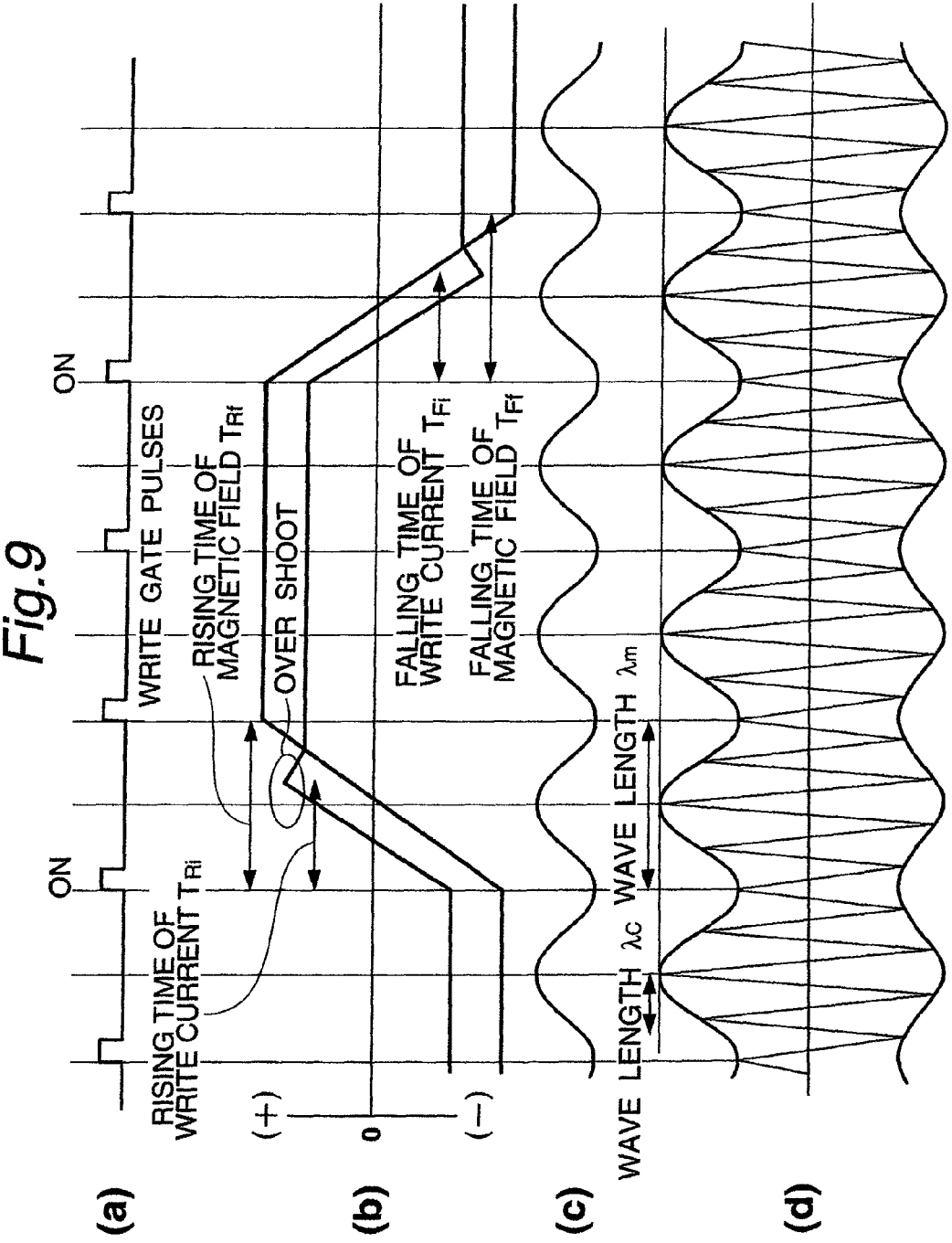
FIG. 9 is a diagram illustrating a relationship between a write field and a microwave-excitation current.
Figure 10:
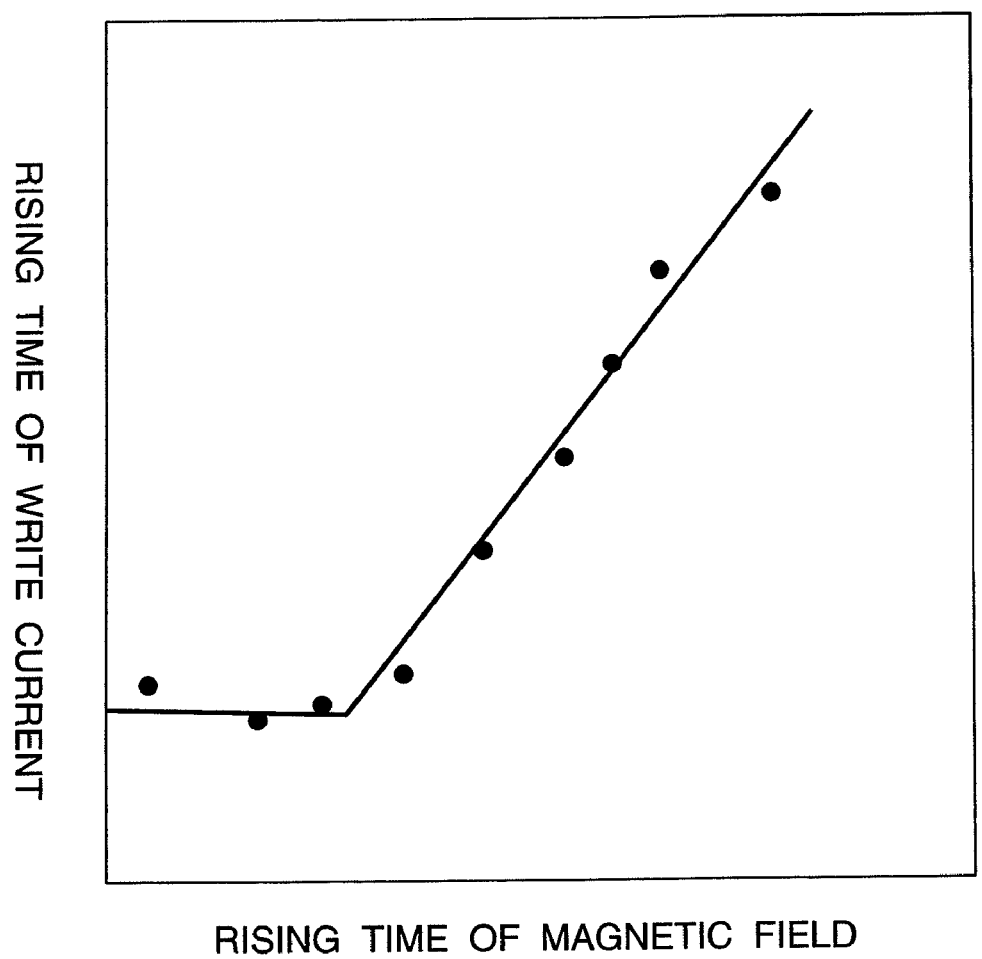
FIG. 10 is a graph showing a relationship between rising time of the write current and rising time of the write field.

FIG. 7 schematically shows the electrical configuration of a magnetic disk drive apparatus in the present embodiment, FIG. 8 schematically shows the configuration of an excitation current generation circuit, FIG. 9 illustrates a relationship between a write field and a microwave-excitation current, and FIG. 10 shows a relationship between rising time of write current and rising time of the write field.

In FIG. 7, reference numeral 11 indicates a spindle motor for rotating the magnetic disk 10, 70 indicates a motor driver as a driver of the spindle motor 11, 71 is a VCM driver as a driver of the VCM 17, 72 indicates a hard disk controller (HDC) for controlling the motor driver 70 and the VCM driver 71 according to the control of a computer 73, 74 indicates a read/write IC circuit including a head amplifier 74a of the thin-film magnetic head 13 and a read/write channel 74b, 75 indicates an excitation current generation circuit for supplying microwave-excitation current, and 76 indicates a head-element wiring member for feeding write signals to be applied to a write head element and for applying constant currents to a read head element to bring out read output voltage, respectively. One output terminal of the excitation current generation circuit 75 is connected to the line conductor 38 of the magnetic head 13 through an excitation-current wiring member 22, etc., and the other output terminal is grounded. The magnetic disk 10 is grounded through the spindle motor 11, etc.

The record/reproduction and resonance control circuit 19 shown in FIG. 1 is constituted by the above-described HDC 72, computer 73, read/write IC circuit 74, excitation current generation circuit 75, etc.

As shown in FIG. 8, the excitation current generation circuit 75 in the embodiment includes a microwave oscillator 80 having, for example, a Gunn diode, a modulating signal generator 81, and an amplitude modulator 82 for generating the microwave-excitation current by amplitude-modulating a microwave carrier output from the microwave oscillator 80 with a modulating signal output from the modulating signal generator 81.

The modulating signal generator 81 generates a modulating signal which has a fixed period corresponding to the rising or falling time of the write field flux, and which has the negative maximum value at starting times and end times of rising or falling of the write field flux and has the positive maximum value in the middle between the starting time and the end time. For generating the modulating signal, the modulating signal generator 81 receives write gate pulses as shown in FIG. 9(a) from the head amplifier 74a, and as shown in FIG. 9(c), controls so that the negative maximum value of the modulating signal synchronizes with the write gate pulse.

By applying the modulating signal to the amplitude modulator 82, the microwave carrier is amplitude-modulated to generate, as shown in FIG. 9(d), the microwave-excitation current that has the minimum value in the amplitude at starting times and end times of rising or falling of the write field flux and has the maximum value in the amplitude in the middle between the starting time and the end time. The drawing shows an example of a waveform of the microwave-excitation current obtained when modulated with a modulation depth of the modulating signal k=0.5. This example represents a case of $\lambda m=4\lambda c$, where $\lambda c$ is the wavelength of the microwave carrier, and $\lambda m$ the wavelength of the modulating signal.

The microwave-excitation current amplitude-modulated as described above is applied to the line conductor 38, and the generated microwave-resonance magnetic field in an in-plane direction therefore becomes smallest in the amplitude at starting times and end times of rising or falling of the write field flux. Accordingly, the magnetic field in plane lowers the magnetic flux level at every inversion in magnetization, and functions so as to forcibly end the precession movement. As a result, convergence time of inversion in magnetization can be reduced and high-speed data writing can be achieved. Moreover, the instantaneous maximum power for inducing the precession movement can be also increased.

As shown in FIG. 9(b), there is a direct relationship between the rising (toward a positive direction) or falling (toward a negative direction) of the write current and the rising (toward a positive direction) or falling (toward a negative direction) of the write magnetic field, and therefore, by measuring the rising or falling time of the current, there can be figured out the rising or falling time of the flux. FIG. 10 shows one example of this direct relationship.

When the write gate pulse shown in FIG. 9(a) turns on, inversion current starts flowing in the write coil $31b_3$, which causes the write field to start rising simultaneously, as shown in FIG. 9(b). Here, the rising time of the write field $T_{Rf}$ represents the time to reach about 90% of the maximum value, and the falling time of the write field $T_{Ff}$ represents the time to reach about 10% of the maximum value. The rising time of the write current $T_{Ri}$ and the falling time $T_{Fi}$ also represents the same as in the write field.

Figure 11:
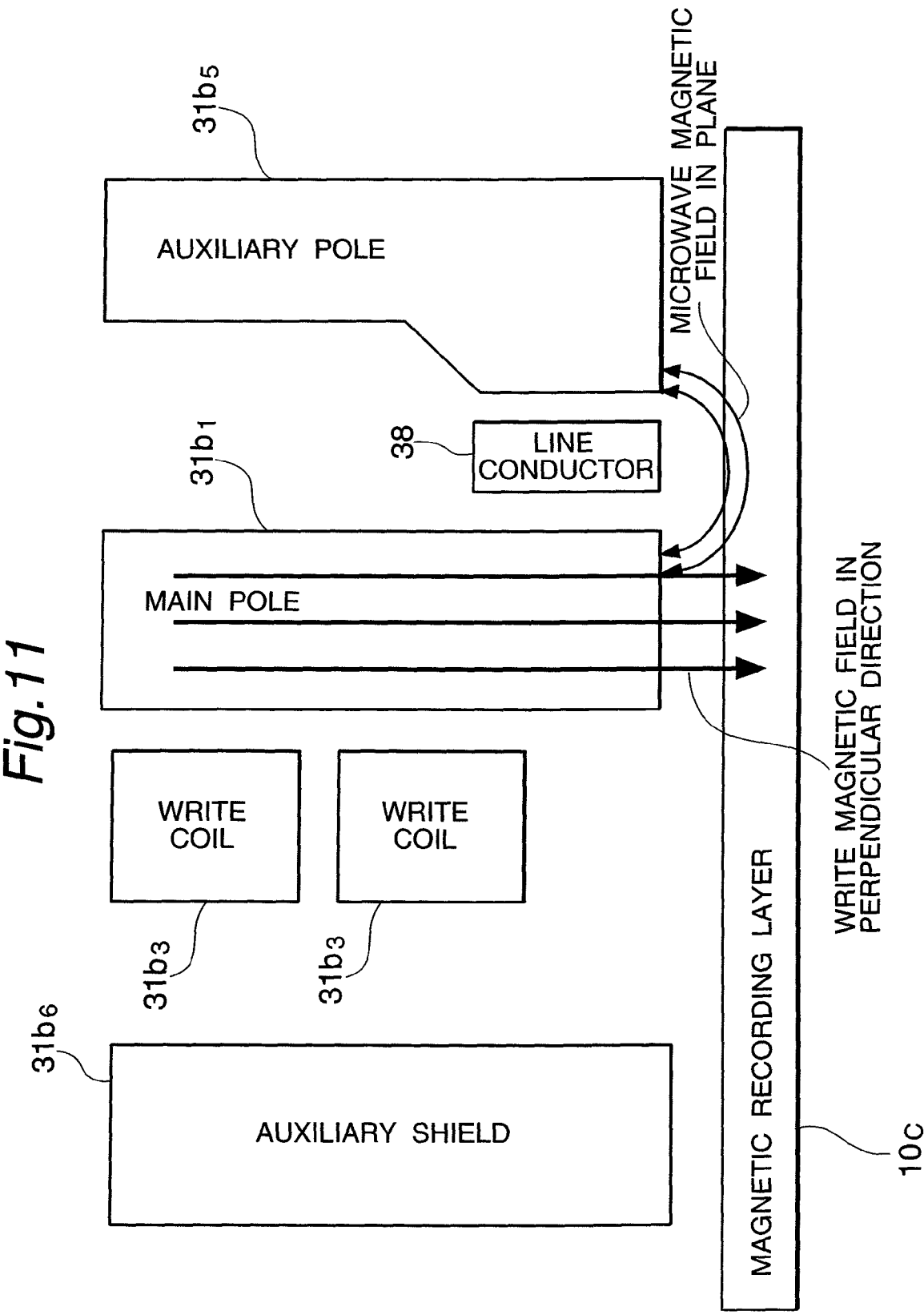
FIG. 11 is a block diagram showing a basic structure of the write head element portion of the thin-film magnetic head and generated magnetic fields in the embodiment of FIG. 1.
Figure 12:
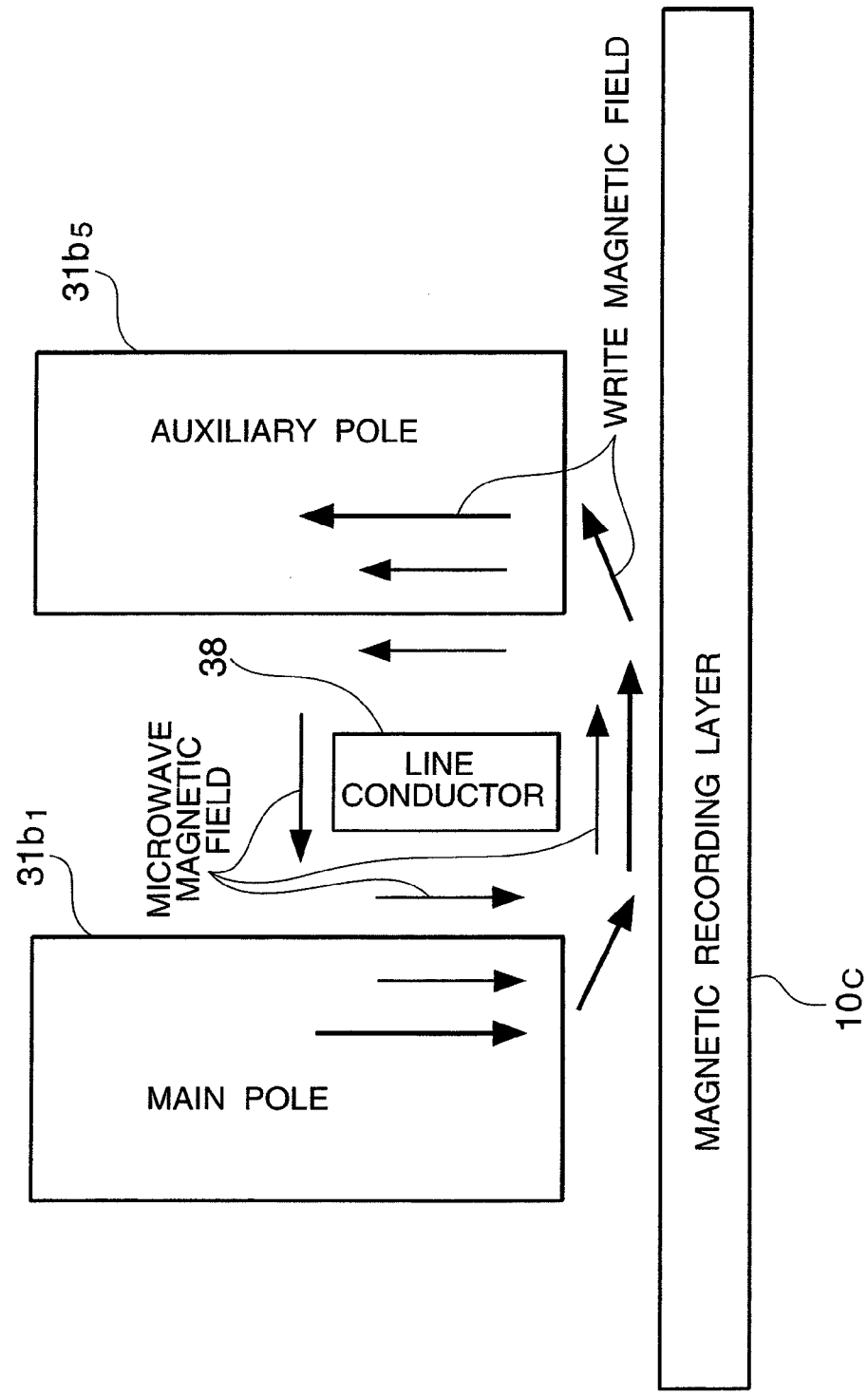
FIG. 12 is a block diagram showing magnetic fields in the parts of a main pole layer and an auxiliary pole layer of FIG. 11.
Figure 13:
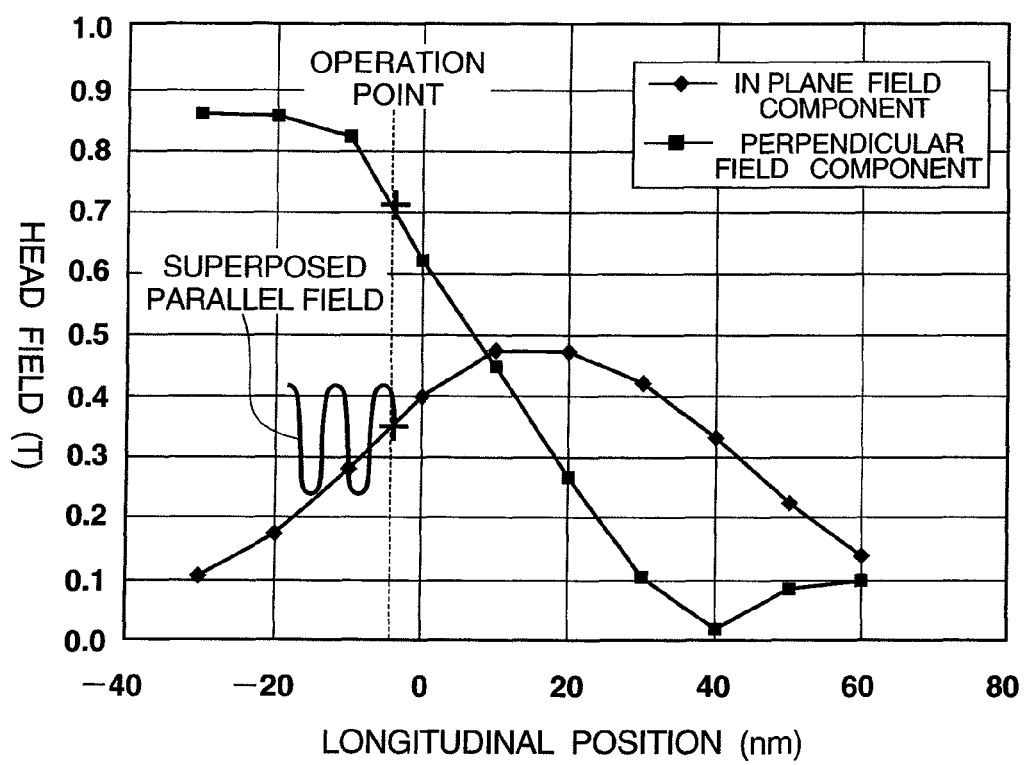
FIG. 13 is a diagram showing the in-plane field component and the perpendicular field component generated with the write current, and the microwave in-plane field component.

FIG. 11 shows a basic structure of the write head element portion of the thin-film magnetic head and generated magnetic fields in the embodiment, FIG. 12 shows magnetic fields in the parts of a main pole layer and an auxiliary pole layer, and FIG. 13 shows the in-plane field component and the perpendicular field component generated with the write current, and the microwave in-plane field component.

As shown in these drawings, by feeding the write current into the write coil (main coil) $31b_3$ adjacent to the main pole layer $31b_1$, there are generated not only a write field in the direction perpendicular to the magnetic recording layer 10c of the magnetic disk 10 but also a magnetic field in the in-plane direction. Moreover, by providing the line conductor (sub coil) 38 of a strip line in the trailing gap layer $31b_2$ between the main pole layer $31b_1$ and the auxiliary pole layer $31b_5$, and by feeding into the conductor 38 the microwave-excitation current having the ferromagnetic resonance frequency $F_R$ or its near frequency of the magnetic recording layer 10c of the magnetic disk 10, there is generated a resonance magnetic field in the in-plane direction having a microwave-band high-frequency magnetic field. The resonance magnetic field in the in-plane direction is superposed on the in-plane field component of the write field as shown in FIG. 13. As a result, the precession movement of magnetization of the magnetic recording layer 10c is induced, to thereby reduce the magnetic field for inversion in magnetization in the perpendicular direction. That is, by applying the resonance magnetic field in the in-plane direction to the magnetic recording layer when writing, there can be remarkably reduced the write field intensity required for writing in the perpendicular direction (a direction perpendicular or nearly perpendicular to the surface of the magnetic recording layer). In other words, the reduction of coercive force facilitates the inversion in magnetization, to thereby enable recording effectively with a smaller recording field. Here, if the resonance magnetic field is radiated with a microwave only, large high-frequency current is required. Therefore, by feeding DC excitation current, which radiates a static magnetic field with about 80% of the coercive force of the magnetic disc 10, into the line conductor 38 with superposition, the power of the microwave to be applied can be reduced.

By applying the resonance magnetic field having the ferromagnetic resonance frequency $F_R$ of the magnetic recording layer 10*c*, the ferromagnetic resonance occurs, which gives the procession movement of magnetization. With this procession movement, the write field in the perpendicular direction, which can inverse the magnetization of the magnetic recording layer 10*c*, is reduced by about 40%, that is, to about 60%. For example, even when the coercive force of the magnetic recording layer 10*c* before application of the resonance magnetic field is about 5 kOe (400 kA/m), the coercive force effectively can be reduced to about 2.4 kOe (192 kA/m).

Meanwhile, the intensity of the resonance magnetic field is preferably set to about 0.1-0.2 $H_K$, where $H_K$ is an anisotropy magnetic field of the magnetic recording layer 10*c*, and the frequency is preferably set to about 1-40 GHz though it depends on included materials, layer thickness, etc, of the magnetic recording layer 10*c*, and more preferably to about 10-40 GHz. It is preferable that the maximum value of the microwave resonance field in the in-plane direction applied to the magnetic recording layer 10*c* is smaller than the maximum value of the write field in the perpendicular direction. For example, the maximum value of the microwave resonance field in the in-plane direction is set to about 25% of the maximum value of the write field in the perpendicular direction. The frequency and the current value of the microwave-excitation current can be established arbitrarily with adjustment of parameters of the excitation current generation circuit 75.

As described above, according to the present embodiment, the period of the modulating signal synchronizes with the rising time of the write field $T_{Rf}$ and/or the falling time of the write field $T_{Ff}$, and therefore the amplitude of the microwave-excitation current becomes smallest at starting times and end times of rising (or at starting times and end times of falling) of the write field and becomes largest in the middle time between the starting time and the end time. As a result, convergence time of inversion in magnetization can be reduced and high-speed data writing can be achieved. Moreover, with the amplitude modulation, the instantaneous maximum power for inducing the precession movement can be increased. Of course, by applying the microwave resonance magnetic field in the in-plane direction to the magnetic recording layer of the magnetic disk, there can be remarkably reduced the write field required for writing to the magnetic recording layer in the perpendicular direction. Accordingly, even when the magnetic recording layer has a large coercive force, data can be recorded. Further, since the microwave resonance magnetic field in the in-plane direction is generated when microwave current is applied to the strip line from the outside, the frequency can be controlled in order of parts per million (ppm), and control of the generated magnetic field can be facilitated. Resultantly, the invention contributes to high-density recording of data, improvement of recording precision and recording quality. Moreover, the microwave resonance magnetic field in the in-plane direction and the write field in the perpendicular direction are generated at the common main pole, so that the structure can be simplified and made compact as well.

Figure 14:
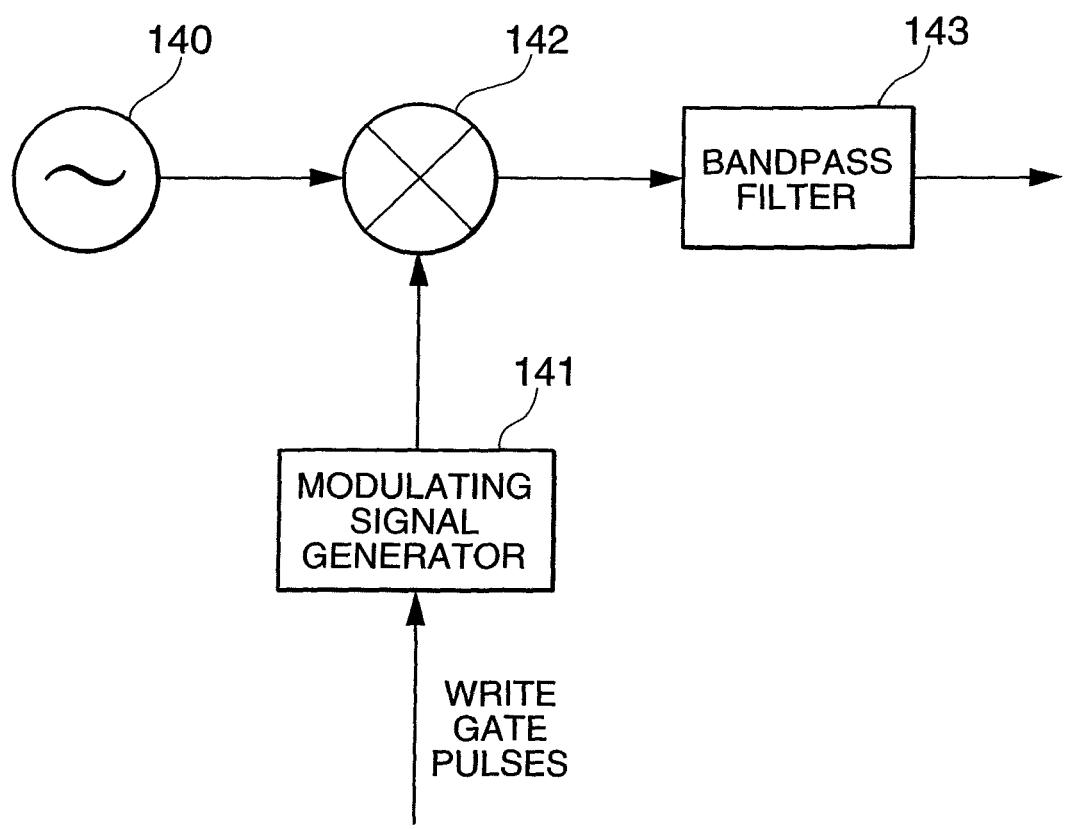
FIG. 14 is a block diagram schematically showing the configuration of an excitation current generation circuit in another embodiment of the magnetic record and reproduction apparatus according to the present invention.

FIG. 14 schematically shows the configuration of an excitation current generation circuit in another embodiment of the magnetic record and reproduction apparatus according to the present invention.

The present embodiment has the same structure as of the embodiment of FIG. 1 except the configuration of the excitation current generation circuit, and therefore an excitation current generation circuit only will be explained hereinafter.

The excitation current generation circuit in the present embodiment includes a microwave oscillator 140 having, for example, a Gunn diode, a modulating signal generator 141, a balanced modulator 142 for outputting a double sideband wave only by amplitude-modulating a microwave carrier output from the microwave oscillator 140 with a modulating signal output from the modulating signal generator 141, and a bandpass filter 143 for attenuating the single sideband wave only out of the double sideband wave output from the balanced modulator 142 to generate an SSB microwave-excitation current.

The modulating signal generator 141 generates a modulating signal that has a fixed period corresponding to the rising or falling time of the write field flux, and that has the negative maximum value at starting times and end times of rising or falling of the write field flux and has the positive maximum value in the middle between the starting time and the end time. For generating the modulating signal, the modulating signal generator 141 receives write gate pulses as shown in FIG. 9(*a*) from the head amplifier 74*a*, and, as shown in FIG. 9(*c*), controls so that the negative maximum value of the modulating signal synchronizes with the write gate pulse.

By applying the modulating signal to the balanced modulator 142, the microwave carrier is amplitude-modulated to output the double sideband wave only with the carrier removed. This output is applied to the bandpass filter 143 to obtain the SSB microwave-excitation current having a lower sideband or an upper sideband wave only. As shown in FIG. 9(*d*), the SSB microwave-excitation current also has the minimum value in the amplitude at starting times and end times of rising or falling of the write field flux and has the maximum value in the amplitude in the middle between the starting time and the end time.

As is well known, in SSB (suppressed-carrier single sideband) technique, out of three components of a lower sideband (LSB), a carrier and an upper sideband (USB), the carrier that does not have information component is removed, and only one of the lower sideband or the upper sideband is left and the other sideband is removed. Therefore, electric power can be saved because the carrier and one of the sidebands do not exist.

Such SSB microwave-excitation current has the power almost equal to the total power of energy that the lower sideband wave or the upper sideband wave has, therefore can obtain about 4 times the power, compared to the normal amplitude modulation in which one sideband wave has the power of 25% (that is, the carrier has energy of 50%, and each sideband has 25%). Moreover, since the frequency spectrum has singularity, when the frequency of either sideband wave is tuned to a required frequency, energy of the other frequency does not appear. That is, the input-power efficiency can be more improved, and also steeper frequency spectrum can be obtained. However, this frequency has to be matched to the ferromagnetic resonance frequency of the magnetic recording layer.

Particularly in the present embodiment, the SSB microwave-excitation current is obtained with a filtering method using a bandpass filter, and therefore the circuit configuration can be simplified. Other functions and effects in the present embodiment are the same as those in the embodiment of FIG. 1.

Figure 15:
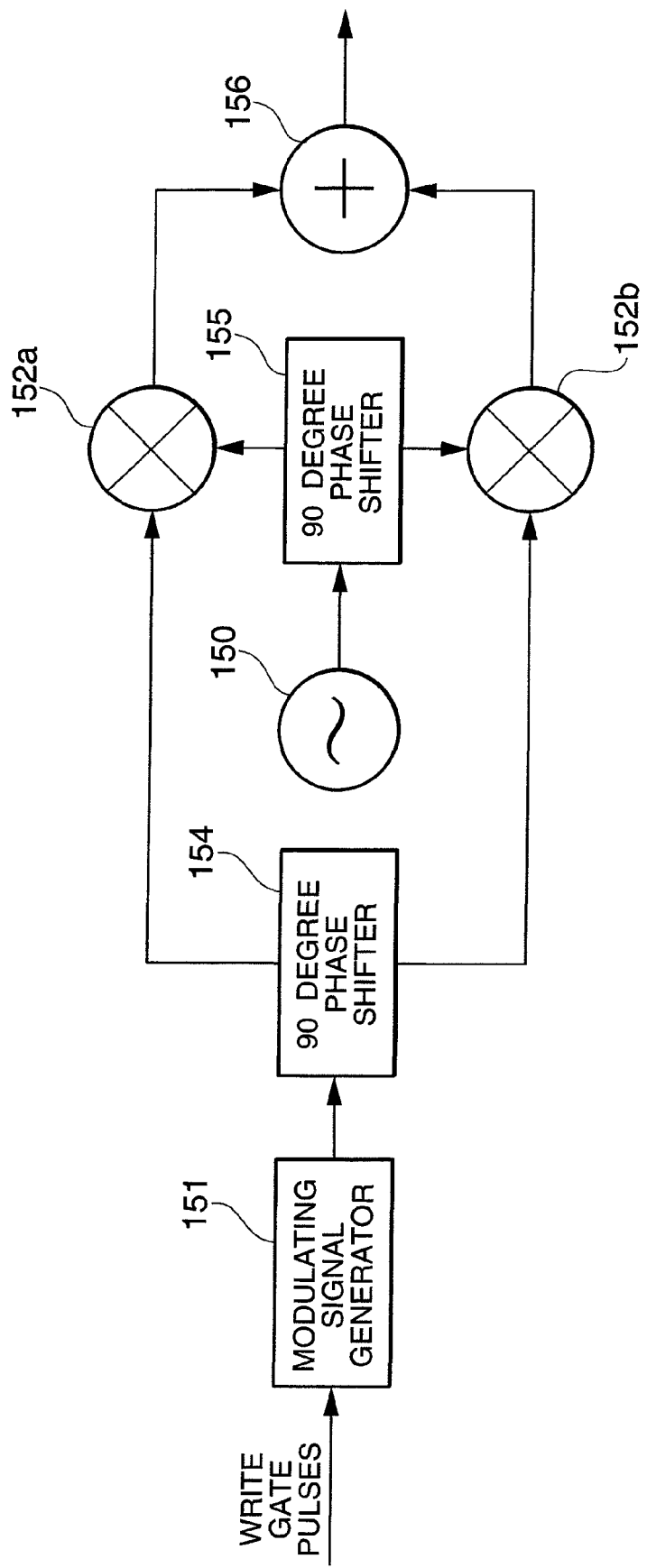
FIG. 15 is a block diagram schematically showing the configuration of an excitation current generation circuit in further embodiment of the magnetic record and reproduction apparatus according to the present invention.

FIG. 15 schematically shows the configuration of an excitation current generation circuit in further embodiment of the magnetic record and reproduction apparatus according to the present invention.

The present embodiment has the same structure as of the embodiment of FIG. 1 except the configuration of the excitation current generation circuit, and therefore an excitation current generation circuit only will be explained hereinafter.

The excitation current generation circuit in the present embodiment has a configuration of a phasing-method used SSB modulation circuit, and includes a microwave oscillator 150 having, for example, a Gunn diode, a modulating signal generator 151, a 90 degree phase shifter 154 that receives a modulating signal from the modulating signal generator 151 and generates two modulating signals differing in phase by 90 degrees, a 90 degree phase shifter 155 that receives a microwave carrier from the microwave oscillator 150 and generates two carrier waves differing in phase by 90 degrees, two balanced modulators 152*a* and 152*b* for outputting double sideband waves only by amplitude-modulating two microwave carriers differing in phase by 90 degrees with two modulating signals differing in phase by 90 degrees, and an adder 156 that adds the double sideband waves differing in phase by 90 degrees output from both balanced modulators 152*a* and 152*b*, and generates an SSB microwave-excitation current having a single sideband wave only.

The modulating signal generator 151 generates a modulating signal that has a fixed period corresponding to the rising or falling time of the write field flux, and that has the negative maximum value at starting times and end times of rising or falling of the write field flux and has the positive maximum value in the middle between the starting time and the end time. For generating the modulating signal, the modulating signal generator 151 receives write gate pulses as shown in FIG. 9(*a*) from the head amplifier 74*a*, and, as shown in FIG. 9(*c*), controls so that the negative maximum value of the modulating signal synchronizes with the write gate pulse.

By applying the two modulating signals, which are phase-shifted from the modulating signal to differ in phase by 90 degrees, to the balanced modulators 152*a* and 152*b*, respectively, the microwave carriers differing in phase by 90 degrees are amplitude-modulated to output the double sideband waves only with the carriers removed. These outputs are applied to the adder 156 to obtain the SSB microwave-excitation current having a lower sideband or an upper sideband wave only. As shown in FIG. 9(*d*), the SSB microwave-excitation current also has the minimum value in the amplitude at starting times and end times of rising or falling of the write field flux and has the maximum value in the amplitude in the middle between the starting time and the end time.

Such SSB microwave-excitation current has the power almost equal to the total power of energy that the lower sideband wave or the upper sideband wave has, therefore, can obtain about 4 times the power, compared to the normal amplitude modulation in which one sideband wave has the power of 25% (that is, the carrier has energy of 50%, and each sideband has 25%). Moreover, since the frequency spectrum has singularity, when the frequency of either sideband wave is tuned to a required frequency, energy of the other frequency does not appear. That is, the input-power efficiency can be more improved, and also steeper frequency spectrum can be obtained. However, this frequency has to be matched to the ferromagnetic resonance frequency of the magnetic recording layer.

Particularly in the embodiment, a phasing SSB modulation method is used, the method dividing the modulating signal into two routes and having different phases to cancel an unnecessary sideband. Therefore the SSB microwave-excitation current is obtained by a phase shift network (PSN) method that does not use a bandpass filter for a narrow band in a high-frequency band, which leads to a lower-cost structure. Other functions and effects in the present embodiment are the same as those in the embodiment of FIG. 1.

Figure 16:
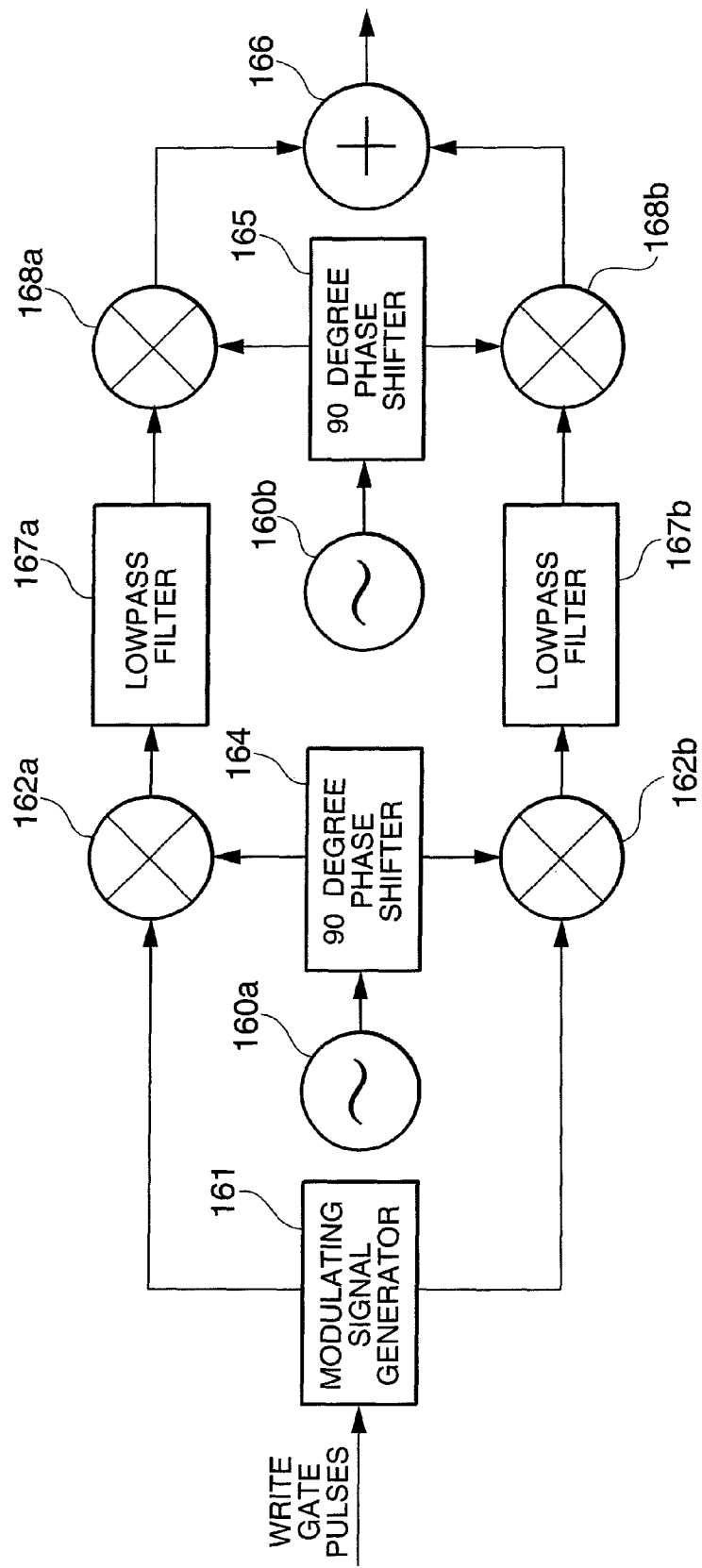
FIG. 16 is a block diagram schematically showing the configuration of an excitation current generation circuit in still another embodiment of the magnetic record and reproduction apparatus according to the present invention.

FIG. 16 schematically shows the configuration of an excitation current generation circuit in further embodiment of the magnetic record and reproduction apparatus according to the present invention.

The present embodiment has the same structure as of the embodiment of FIG. 1 except the configuration of the excitation current generation circuit, and therefore an excitation current generation circuit only will be explained hereinafter.

The excitation current generation circuit in the present embodiment has a configuration of a Weaver-method used SSB modulation circuit, and includes two microwave oscillators 160*a* and 160*b* for generating a different frequency to each other, each having, for example, a Gunn diode, a 90 degree phase shifter 164 that receives a microwave carrier from the microwave oscillator 160*a* and generates two carriers differing in phase by 90 degrees, two balanced modulators 162*a* and 162*b* that amplitude-modulate the two carriers differing in phase by 90 degrees with a modulating signal from a modulating signal generator 161 and output the modulated signals, respectively, two lowpass filters 167*a* and 167*b* that reduce only a single sideband out of double sidebands differing in phase by 90 degrees output from the balanced modulators 162*a* and 162*b*, respectively, a 90 degree phase shifter 165 that receives a microwave carrier from the microwave oscillator 160*b* and generates two carriers differing in phase by 90 degrees, two balanced modulators 168*a* and 168*b* that amplitude-modulate the two carriers differing in phase by 90 degrees with signals from the two lowpass filters 167*a* and 167*b* and output the modulated signals, respectively, and an adder 166 that adds the outputs from the two balanced modulators 168*a* and 168*b* and generates an SSB microwave-excitation current having a single sideband wave only.

The modulating signal generator 161 generates a modulating signal that has a fixed period corresponding to the rising or falling time of the write field flux, and that has the negative maximum value at starting times and end times of rising or falling of the write field flux and has the positive maximum value in the middle between the starting time and the end time. For generating the modulating signal, the modulating signal generator 161 receives write gate pulses as shown in FIG. 9(*a*) from the head amplifier 74*a*, and, as shown in FIG. 9(*c*), controls so that the negative maximum value of the modulating signal synchronizes with the write gate pulse.

Thus, by using microwave carriers having different frequencies to each other (one is near to a modulation frequency) and modulated signals processed so as to have different phases by 90 degrees, the SSB microwave-excitation current having a lower sideband or an upper sideband wave only can be obtained. As shown in FIG. 9(*d*), the SSB microwave-excitation current also has the minimum value in the amplitude at starting times and end times of rising or falling of the write field flux and has the maximum value in the amplitude in the middle between the starting time and the end time.

Such SSB microwave-excitation current has the power almost equal to the total power of energy that the lower sideband wave or the upper sideband wave has, therefore can obtain about 4 times the power, compared to the normal amplitude modulation in which one sideband wave has the power of 25% (that is, the carrier has energy of 50%, and each sideband has 25%). Moreover, since the frequency spectrum has singularity, when the frequency of either sideband wave is tuned to a required frequency, energy of the other frequency does not appear. That is, the input-power efficiency can be more improved, and also steeper frequency spectrum can be obtained. However, this frequency has to be matched to the ferromagnetic resonance frequency of the magnetic recording layer.

Particularly in the present embodiment, the Weaver SSB modulation method is employed, wherein the phasing SSB modulation method is further improved, and unnecessary sideband is superposed within its own band so as not to be leaked outside. Accordingly, the present embodiment can obtain stable SSB microwave-excitation current, and is also applicable to a digital system that uses software. Other functions and effects in the present embodiment are the same as those in the embodiment of FIG. 1.

FIG. 17 schematically shows the structure of a write head element portion of a thin-film magnetic head in yet another embodiment of the magnetic record and reproduction apparatus according to the present invention and the structure of the magnetic disk opposed to the thin-film magnetic head.

The present embodiment has the same structure as of the embodiment of FIG. 1 except the structure of the line conductor in the write head element portion, and therefore the structure of a line conductor only will be explained hereinafter.

In the present embodiment, a line conductor (sub coil) 178 is formed between the main pole principal layer $31b_{12}$ of the main pole layer $31b_1$ and the trailing shield portion $31b_{51}$ of the auxiliary pole layer $31b_5$, and the line conductor 178 has a depth longer than the line conductor 38 in the embodiment of FIG. 1 in the direction opposite to the ABS. That is, the end of the line conductor 178 in the ABS side, in the embodiment, is positioned on the same plane as the ends of the main pole principal layer $31b_{12}$ of the main pole layer $31b_1$ and the trailing shield portion $31b_{51}$ of the auxiliary pole layer $31b_5$ in the ABS side, or on a position retracted from the plane to a direction opposite to the ABS, and the end of the line conductor 178 in the side opposite to the ABS is on a position retracted largely from the end in the side opposite to the ABS of the trailing shield portion $31b_{51}$ of the auxiliary pole layer $31b_5$. In the embodiment, the length of the line conductor 178 in the track-width direction is equal or larger to or than the length of the main pole principal layer $31b_{12}$ of the main pole layer $31b_1$ in the track-width direction.

Other structure and functions and effects in the present embodiment are the same as those in the embodiment of FIG. 1.

FIG. 18 schematically shows the structure of a write head element portion of a thin-film magnetic head in still another embodiment of the magnetic record and reproduction apparatus according to the present invention and the structure of the magnetic disk opposed to the thin-film magnetic head.

The present embodiment has the same structure as of the embodiment of FIG. 1 except the structure of the line conductor in the write head element portion, and therefore the structure of a line conductor only will be explained hereinafter.

In the present embodiment, three line conductors (sub coils) 188a, 188b and 188c are formed between the main pole principal layer $31b_{12}$ of the main pole layer $31b_1$ and the trailing shield portion $31b_{51}$ of the auxiliary pole layer $31b_5$. These line conductors (sub coils) 188a, 188b and 188c correspond to the parts divided into three parts from the line conductor 178 of FIG. 17 and are connected in parallel to each other.

Other structure and functions and effects in the present embodiment are the same as those in the embodiment of FIG. 1 band FIG. 17.

FIG. 19 schematically shows the structure of a write head element portion of a thin-film magnetic head in yet a further embodiment of the magnetic record and reproduction apparatus according to the present invention and the structure of the magnetic disk opposed to the thin-film magnetic head.

The present embodiment has the same structure as of the embodiment of FIG. 1 except the structure of the line conductor in the write head element portion, and therefore the structure of a line conductor only will be explained hereinafter.

In the present embodiment, between the main pole principal layer $31b_{12}$ of the main pole layer $31b_1$ and the trailing shield portion $31b_{51}$ of the auxiliary pole layer $31b_5$, there is formed a line conductor (sub coil) 198a that is the same as in the embodiment of FIG. 1, and further a line conductor (sub coil) 198b positioned on the side opposite to the ABS and having a larger thickness in the stacking direction. The end of the latter line conductor 198b in the ABS side is on a position retracted largely from the end in the side opposite to the ABS of the trailing shield portion $31b_{51}$ of the auxiliary pole layer $31b_5$. In the embodiment, the length of the line conductors 198a and 198b in the track-width direction is equal or larger to or than the length of the main pole principal layer $31b_{12}$ of the main pole layer $31b_1$ in the track-width direction.

Other structure and functions and effects in the present embodiment are the same as those in the embodiment of FIG. 1.

FIG. 20 schematically shows the structure of a write head element portion of a thin-film magnetic head in another embodiment of the magnetic record and reproduction apparatus according to the present invention and the structure of the magnetic disk opposed to the thin-film magnetic head.

The present embodiment has the same structure as of the embodiment of FIG. 1 except the structure of the line conductor in the write head element portion, and therefore the structure of a line conductor only will be explained hereinafter.

In the present embodiment, there is formed a line conductor (sub coil) 208a similar to the line conductor 198b of FIG. 19, and additionally a line conductor (sub coil) 208b having a similar shape disposed behind the conductor 198a (in the side opposite to the ABS).

In the embodiment, the length of the line conductors 208a and 208b in the track-width direction is equal or larger to or than the length of the main pole principal layer $31b_{12}$ of the main pole layer $31b_1$ in the track-width direction.

Other structure and functions and effects in the present embodiment are the same as those in the embodiment of FIG. 1.

Hereinbefore, the structure of the thin-film magnetic head 13 is described in detail, but it is obvious that the thin-film magnetic head according to the present invention is not limited to the structures described above and other various structures may be taken.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic recording apparatus comprising:
a magnetic recording medium having a magnetic recording layer;
a thin-film magnetic head with a microwave-band magnetic drive function, the head having write field generation means that generates a write field to the magnetic recording medium in response to a write signal, and a microwave generator that is provided independent of the write field generation means and generates an alternating magnetic field in plane having a microwave-band frequency when microwave-excitation current is fed;
excitation current generation means that generates the microwave-excitation current by amplitude-modulating microwave carrier current with a modulating signal having a fixed period, said excitation current generation means including at least a microwave oscillator, a modulating signal generator and an amplitude modulator; and
write signal supply means that generates the write signal and applies the write signal to the write field generation means of the thin-film magnetic head.

2. The magnetic recording apparatus as claimed in claim 1, wherein the modulating signal is a modulating signal having a fixed period corresponding to the rising or falling time of flux of the write field.

3. The magnetic recording apparatus as claimed in claim 2, wherein the microwave-excitation current is microwave-excitation current that has the minimum amplitude at starting times and end times of rising or falling of the flux of the write field and has the maximum amplitude in the middle between the starting time and the end time.

4. The magnetic recording apparatus as claimed in claim 1, wherein the excitation current generation means is configured to generate a suppressed-carrier single sideband of the microwave-excitation current.

5. The magnetic recording apparatus as claimed in claim 1, wherein the thin-film magnetic head comprises a write head element of a perpendicular magnetic recording type, the write head element comprising: a main pole; an auxiliary pole; and coil means wound passing between the main pole and the auxiliary pole, and wherein the write field generation means corresponds to the coil means, and the microwave generator is arranged between the main pole and the auxiliary pole.

6. The magnetic recording apparatus as claimed in claim 5, wherein the magnetic recording apparatus is a magnetic record and reproduction apparatus, and wherein the thin-film magnetic head further comprises a tunnel magnetoresistive effect read head element or a giant magnetoresistive effect read head element.

7. The magnetic recording apparatus as claimed in claim 1, wherein the microwave generator radiates a microwave-hand resonance magnetic field having a ferromagnetic resonance frequency $F_R$ or its near frequency of the magnetic recording medium when the microwave-excitation current is fed.

8. The magnetic recording apparatus as claimed in claim 1, wherein the maximum value of the alternating magnetic field in plane is smaller than the maximum value of the write field.

9. The magnetic recording apparatus as claimed in claim 1, wherein, in a position of the magnetic recording layer of the magnetic recording medium, the write field is established so as to have a direction perpendicular or nearly perpendicular to the outer surface of the magnetic recording layer, and the alternating magnetic field in plane is established so as to have an in-plane or nearly in-plane direction of the outer surface of the magnetic recording layer.

* * * * *